US012647369B2

(12) United States Patent
Naik et al.

(10) Patent No.: US 12,647,369 B2
(45) Date of Patent: Jun. 2, 2026

(54) TRAFFIC IDENTIFICATION USING MACHINE LEARNING

(71) Applicant: QUALCOMM Incorporated, San Diego, CA (US)

(72) Inventors: Gaurang Naik, San Diego, CA (US); Sai Yiu Duncan Ho, San Diego, CA (US); George Cherian, San Diego, CA (US); Yanjun Sun, San Diego, CA (US); Abhishek Pramod Patil, San Diego, CA (US); Alfred Asterjadhi, San Diego, CA (US); Abdel Karim Ajami, Lakeside, CA (US); Xiaolong Huang, Santee, CA (US); Qiang Fan, Plainsboro, NJ (US); Srinivas Katar, Fremont, CA (US); Nitin Ravinder, San Diego, CA (US); Venkata Savitri Pravallika Tallapragada, San Diego, CA (US); Varshini Rajesh, New York, NY (US); Raamkumar Balamurthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 18/053,285

(22) Filed: Nov. 7, 2022

(65) Prior Publication Data

US 2024/0154911 A1    May 9, 2024

(51) Int. Cl.
    *H04L 47/2441*    (2022.01)
    *H04W 28/08*    (2023.01)
(52) U.S. Cl.
    CPC ..... *H04L 47/2441* (2013.01); *H04W 28/0908* (2020.05)

(58) Field of Classification Search
    None
    See application file for complete search history.

(56) References Cited

U.S. PATENT DOCUMENTS 10,803,328 B1 * 10/2020 Bai ........................ G06V 20/58
11,658,989 B1    5/2023 Ding et al.
(Continued)

FOREIGN PATENT DOCUMENTS

CN        115118653 A    9/2022
WO    WO-2022056502 A1    3/2022

OTHER PUBLICATIONS

International Search Report and Written Opinion—PCT/US2023/077008—ISA/EPO—Apr. 5, 2024.
(Continued)

*Primary Examiner* — Anh Ngoc M Nguyen
(74) *Attorney, Agent, or Firm* — Holland & Hart LLP

(57)            ABSTRACT

Methods, systems, and devices for wireless communications are described. A first device may receive signaling associated with a traffic class from a second device. The first device may determine that the traffic class is included in a set of known traffic classes based on a set of features associated with the signaling. In response to determining that the traffic class is included in the set of known traffic classes, the first device may use a machine learning model to obtain a prediction of an application associated with the signaling. The prediction may be based on the set of features. The machine learning model may be trained at the first device or the second device. The first device may receive information associated with the machine learning model from the second device.

34 Claims, 15 Drawing Sheets

(56) References Cited

U.S. PATENT DOCUMENTS

| | | | |
|---|---|---|---|
| 2020/0372386 A1 | 11/2020 | Kotolyan | |
| 2020/0382616 A1 | 12/2020 | Vaishampayan et al. | |
| 2021/0092068 A1* | 3/2021 | Ismailsheriff | H04L 47/22 |
| 2021/0203565 A1* | 7/2021 | Arora | G06N 5/04 |
| 2021/0204152 A1 | 7/2021 | Vasudevan et al. | |
| 2021/0405990 A1 | 12/2021 | Li et al. | |
| 2024/0054179 A1* | 2/2024 | Elyasi | G06F 12/0842 |
| 2024/0154912 A1 | 5/2024 | Naik et al. | |

OTHER PUBLICATIONS

Jin D., et al., "Zero-Day Traffic Identification Using One-Dimension Convolutional Neural Networks And Auto Encoder Machine", 2020 IFIP Networking Conference (Networking), IFIP, Jun. 22, 2020, pp. 559-563, XP033795294, Abstract, pp. 559-560, "I. Introduction" p. 561, Left Column, "C. EVT Model".

Nguyen T.T.T., et al., "A Survey of Techniques for Internet Traffic Classification Using Machine Learning", IEEE Communications Surveys & Tutorials, vol. 10, No. 4, Fourth Quarter 2008, vol. 10, No. 4, Oct. 1, 2008, pp. 56-76, XP011249736, p. 56, RC, Fourth Para, The Research Community. p. 57, LC, First Para p. 57, RC, "B. Traffic Classification Metrics" p. 59, RC, "2) Different Types of Learning:" p. 60, First Para p. 61, RC, "B. The Application of ML in IP Traffic Classification" p. 63, Fourth Para p. 69, RC, Penultimate Para.

Pacheco F., et al., "Towards the Deployment of Machine Learning Solutions in Network Traffic Classification: A Systematic Survey", IEEE Communications Surveys & Tutorials, vol. 21, No. 2, Second Quarter 2019, pp. 1988-2014, May 31, 2019, XP011727911, p. 1988, "I. Introduction" p. 1990, "A. Machine Learning Introduction" p. 1994, Left Column, "5) Machine Learning" p. 1999, Right Column, "C. Time-Series Based Features" p. 2003, Right Column, "D. Hybrids and Advanced Techniques".

Partial International Search Report—PCT/US2023/077008—ISA/EPO—Feb. 1, 2024.

* cited by examiner

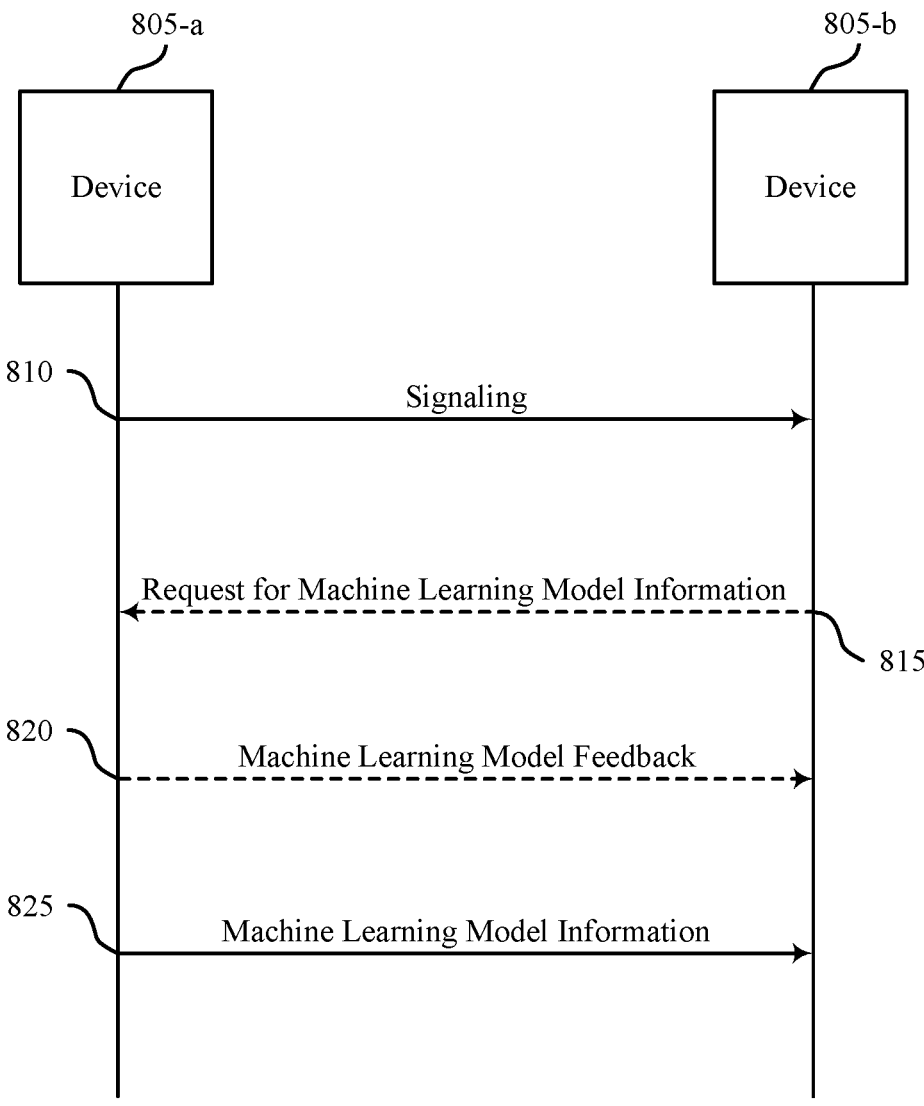
FIG. 8

Traffic Class Component

1125

Application Component

1135

Energy Metric Component

1145

Reconstruction Component

1155

Training Component

1165

Binning Component

1175

Feature Component

1130

Machine Learning Model Component

1140

Sampling Component

1150

Confidence Level Component

1160

Feedback Component

1170

Threshold Component

1180

1120

1100

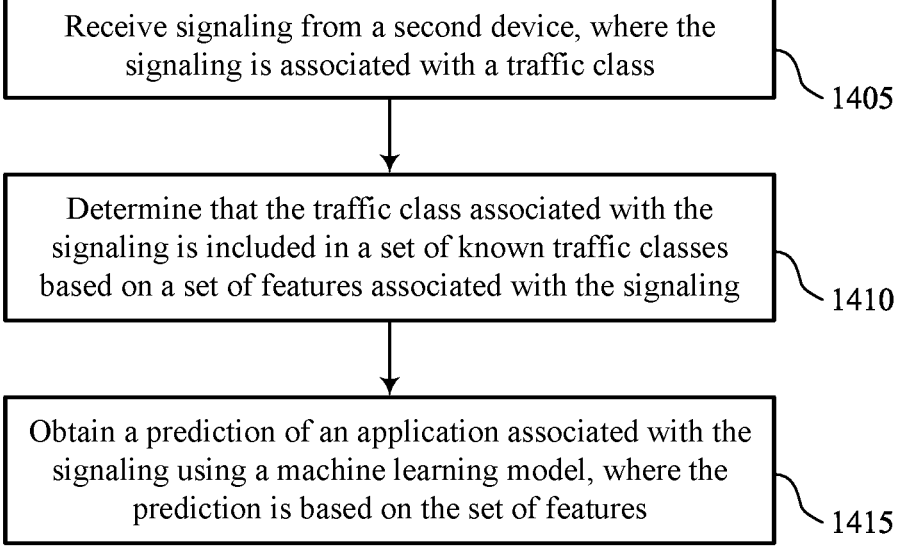

Receive signaling from a second device, where the signaling is associated with a traffic class

1405

Determine that the traffic class associated with the signaling is included in a set of known traffic classes based on a set of features associated with the signaling

1410

Obtain a prediction of an application associated with the signaling using a machine learning model, where the prediction is based on the set of features

TRAFFIC IDENTIFICATION USING MACHINE LEARNING

FIELD OF TECHNOLOGY

The following relates to wireless communications, including traffic identification using machine learning.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local-area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP. In some wireless communications systems, it may be beneficial for a wireless device (e.g., a STA, an AP) to classify traffic associated with signaling received at the wireless device. In some cases, however, existing techniques for classifying traffic may be deficient.

SUMMARY

The described techniques relate to improved methods, systems, devices, or apparatuses that support traffic identification using machine learning. For example, a device may support a framework for determining whether a traffic class is known to a machine learning model. In some examples, a first device may receive signaling associated with a traffic class from a second device. In some examples, the first device may determine that the traffic class is included in a set of known traffic classes based on a set of features associated with the signaling. In response to determining that the traffic class is included in the set of known traffic classes, the first device may use a machine learning model to obtain a prediction of an application associated with the signaling. In some examples, the prediction may be based on the set of features. The machine learning model may be trained at the first device or the second device. For example, the first device may receive information associated with the machine learning model from the second device.

A method for wireless communication at a first device is described. The method may include receiving signaling from a second device, where the signaling is associated with a traffic class, determining that the traffic class associated with the signaling is included in a set of known traffic classes based on a set of features associated with the signaling, and obtaining a prediction of an application associated with the signaling using a machine learning model, where the prediction is based on the set of features.

An apparatus for wireless communication at a first device is described. The apparatus may include a processor, memory coupled with the processor, and instructions stored in the memory. The instructions may be executable by the processor to cause the apparatus to receive signaling from a second device, where the signaling is associated with a traffic class, determine that the traffic class associated with the signaling is included in a set of known traffic classes based on a set of features associated with the signaling, and obtain a prediction of an application associated with the signaling using a machine learning model, where the prediction is based on the set of features.

Another apparatus for wireless communication at a first device is described. The apparatus may include means for receiving signaling from a second device, where the signaling is associated with a traffic class, means for determining that the traffic class associated with the signaling is included in a set of known traffic classes based on a set of features associated with the signaling, and means for obtaining a prediction of an application associated with the signaling using a machine learning model, where the prediction is based on the set of features.

A non-transitory computer-readable medium storing code for wireless communication at a first device is described. The code may include instructions executable by a processor to receive signaling from a second device, where the signaling is associated with a traffic class, determine that the traffic class associated with the signaling is included in a set of known traffic classes based on a set of features associated with the signaling, and obtain a prediction of an application associated with the signaling using a machine learning model, where the prediction is based on the set of features.

Some examples of the method, apparatuses, and non-transitory computer-readable medium described herein may further include operations, features, means, or instructions for determining that the traffic class associated with the signaling corresponds to a periodic traffic class based on an energy metric associated with the set of features satisfying a threshold, where determining that the traffic class may be included in the set of known traffic classes may be based on the traffic class corresponding to the periodic traffic class.

Some examples of the method, apparatuses, and non-transitory computer-readable medium described herein may further include operations, features, means, or instructions for determining a first energy metric associated with a first traffic class and a second energy metric associated with a second traffic class and selecting the threshold based on a difference between the first energy metric and the second energy metric.

Some examples of the method, apparatuses, and non-transitory computer-readable medium described herein may further include operations, features, means, or instructions for obtaining an information set based on sampling the signaling in a time domain and in accordance with a sampling rate, where the sampling rate may be based on a rate at which the signaling may be received at the first device and identifying the set of features based on translating the information set from the time domain to a frequency domain.

Some examples of the method, apparatuses, and non-transitory computer-readable medium described herein may further include operations, features, means, or instructions for binning the information set in the frequency domain, where identifying the set of features may be further based on the binning.

Some examples of the method, apparatuses, and non-transitory computer-readable medium described herein may further include operations, features, means, or instructions for identifying a set of multiple sets of features associated with the signaling, where determining that the traffic class associated with the signaling may be included in the set of known traffic classes may be based on the set of multiple sets of features.

In some examples of the method, apparatuses, and non-transitory computer-readable medium described herein, each set of features of the set of multiple sets of features corresponds to a respective internet protocol flow.

In some examples of the method, apparatuses, and non-transitory computer-readable medium described herein, each set of features of the set of multiple sets of features corresponds to a respective time interval during which the signaling may be received.

Some examples of the method, apparatuses, and non-transitory computer-readable medium described herein may further include operations, features, means, or instructions for combining at least two sets of features of the set of multiple sets of features, where determining that the traffic class associated with the signaling may be included in the set of known traffic classes may be based on a combination of the at least two sets of features.

Some examples of the method, apparatuses, and non-transitory computer-readable medium described herein may further include operations, features, means, or instructions for obtaining a reconstruction of the set of features using an autoencoder, where determining that the traffic class associated with the signaling may be included in the set of known traffic classes may be based on a loss associated with the reconstruction satisfying a threshold.

In some examples of the method, apparatuses, and non-transitory computer-readable medium described herein, the loss includes a reconstruction loss and the reconstruction loss corresponds to a difference between the reconstruction of the set of features and the set of features.

In some examples of the method, apparatuses, and non-transitory computer-readable medium described herein, the autoencoder may be one or a set of multiple autoencoders used at the first device and each autoencoder of the set of multiple autoencoders may be associated with a respective traffic class of the set of known traffic classes.

Some examples of the method, apparatuses, and non-transitory computer-readable medium described herein may further include operations, features, means, or instructions for training the autoencoder using a set of multiple sets of features, where each set of features of the set of multiple sets of features may be associated with a respective traffic class of the set of known traffic classes and selecting the threshold based on distribution of loss across the set of multiple sets of features.

Some examples of the method, apparatuses, and non-transitory computer-readable medium described herein may further include operations, features, means, or instructions for identifying a first traffic class based on determining that the traffic class associated with the signaling may be included in the set of known traffic classes, determining that a second traffic class associated with the application may be consistent with the first traffic class, and obtaining a confidence level associated with the prediction of the application based on determining that the second traffic class may be consistent with the first traffic class.

Some examples of the method, apparatuses, and non-transitory computer-readable medium described herein may further include operations, features, means, or instructions for performing one or more operations in accordance with the traffic class based on the confidence level associated with the prediction of the application.

In some examples of the method, apparatuses, and non-transitory computer-readable medium described herein, the first device includes an access point (AP) and performing the one or more operations includes performing quality of service (QoS) provisioning, scheduling communications with the second device, performing load balancing, determining a mapping between one or more traffic classes and one or more communication links, performing admission control, or predicting movement of a user associated with the second device, or any combination thereof.

In some examples of the method, apparatuses, and non-transitory computer-readable medium described herein, the first device includes a client and performing the one or more operations includes identifying one or more communication links to use while operating in an active mode, identifying one or more power save patterns, populating a QoS characteristics element, identifying a value of a restricted target wake time parameter, identifying a channel access mechanism, predicting movement of a user associated with the first device, or any combination thereof.

Some examples of the method, apparatuses, and non-transitory computer-readable medium described herein may further include operations, features, means, or instructions for training the machine learning model using a set of multiple information sets, where each information set of the set of multiple information sets may be associated with a respective application, where the prediction of the application may be based on training the machine learning model.

In some examples of the method, apparatuses, and non-transitory computer-readable medium described herein, the set of features includes a quantity of packets, a statistic based on the quantity of packets, or a statistic based on an inter-arrival time.

In some examples of the method, apparatuses, and non-transitory computer-readable medium described herein, the set of features may be based on a transmission direction associated with the signaling.

In some examples of the method, apparatuses, and non-transitory computer-readable medium described herein, the machine learning model includes a multi-class classifier.

In some examples of the method, apparatuses, and non-transitory computer-readable medium described herein, the traffic class corresponds to a type of application and the type of application includes an extended reality (XR) application, a gaming application, or a video conferencing application.

A method for wireless communication at a first device is described. The method may include transmitting signaling to a second device, where the signaling is associated with a traffic class and transmitting a first message indicating information associated with a machine learning model, where the machine learning model is to be used at the second device for identifying the traffic class.

An apparatus for wireless communication at a first device is described. The apparatus may include a processor, memory coupled with the processor, and instructions stored in the memory. The instructions may be executable by the processor to cause the apparatus to transmit signaling to a second device, where the signaling is associated with a traffic class and transmit a first message indicating information associated with a machine learning model, where the machine learning model is to be used at the second device for identifying the traffic class.

Another apparatus for wireless communication at a first device is described. The apparatus may include means for transmitting signaling to a second device, where the signaling is associated with a traffic class and means for transmitting a first message indicating information associated with a machine learning model, where the machine learning model is to be used at the second device for identifying the traffic class.

A non-transitory computer-readable medium storing code for wireless communication at a first device is described. The code may include instructions executable by a processor to transmit signaling to a second device, where the signaling is associated with a traffic class and transmit a first message indicating information associated with a machine learning model, where the machine learning model is to be used at the second device for identifying the traffic class.

Some examples of the method, apparatuses, and non-transitory computer-readable medium described herein may further include operations, features, means, or instructions for receiving, from the second device, a second message requesting the information associated with the machine learning model, where transmitting the first message may be based on receiving the second message.

Some examples of the method, apparatuses, and non-transitory computer-readable medium described herein may further include operations, features, means, or instructions for transmitting, to the second device, a second message indicating feedback associated with a performance of a first machine learning model used at the second device for classifying traffic, where transmitting the first message may be based on the feedback.

Some examples of the method, apparatuses, and non-transitory computer-readable medium described herein may further include operations, features, means, or instructions for transmitting the second message may be based on determining that a first traffic class identified at the second device may be different from a second traffic class associated with the signaling transmitted to the second device.

Some examples of the method, apparatuses, and non-transitory computer-readable medium described herein may further include operations, features, means, or instructions for receiving, from the second device, a second message indicating feedback associated with a performance of a first machine learning model used at the second device for classifying traffic, where transmitting the first message requesting the information associated with the machine learning model may be based on the feedback.

Some examples of the method, apparatuses, and non-transitory computer-readable medium described herein may further include operations, features, means, or instructions for training the machine learning model using a set of multiple information sets, where each information set of the set of multiple information sets may be associated with a respective traffic class of a set of known traffic classes, and where the machine learning model may be used for identifying, at the second device, whether the traffic class associated with the signaling transmitted from the first device may be included in the set of known traffic classes.

Some examples of the method, apparatuses, and non-transitory computer-readable medium described herein may further include operations, features, means, or instructions for training the machine learning model using a set of multiple information sets, where each information set of the set of multiple information sets may be associated with a respective application of a set of multiple applications, and where the machine learning model may be used for identifying, at the second device, an application associated with the signaling transmitted from the first device.

Some examples of the method, apparatuses, and non-transitory computer-readable medium described herein may further include operations, features, means, or instructions for training the machine learning model using a set of multiple information sets, where each information set of the set of multiple information sets may be associated with a respective internet protocol flow of a set of multiple internet protocol flows, and where the machine learning model may be used for identifying, at the second device, an internet protocol flow associated with the signaling transmitted from the first device.

Some examples of the method, apparatuses, and non-transitory computer-readable medium described herein may further include operations, features, means, or instructions for training the machine learning model using a set of multiple information sets, where each information set of the set of multiple information sets may be associated with a respective access category of a set of multiple access categories, and where the machine learning model may be used for identifying, at the second device, an access category associated with the signaling transmitted from the first device.

Some examples of the method, apparatuses, and non-transitory computer-readable medium described herein may further include operations, features, means, or instructions for training the machine learning model using a set of multiple information sets, where each information set of the set of multiple information sets may be associated with a respective traffic identifier of a set of multiple traffic identifiers, and where the machine learning model may be used, at the second device, for identifying a traffic identifier associated with the signaling transmitted from the first device.

Some examples of the method, apparatuses, and non-transitory computer-readable medium described herein may further include operations, features, means, or instructions for training the machine learning model using a set of multiple information sets, where each information set of the set of multiple information sets may be associated with a respective user priority of a set of multiple user priorities, and where the machine learning model may be used for identifying, at the second device, a user priority associated with the signaling transmitted from the first device.

Some examples of the method, apparatuses, and non-transitory computer-readable medium described herein may further include operations, features, means, or instructions for training the machine learning model using a set of multiple information sets, where each information set of the set of multiple information sets may be associated with a respective periodicity, and where the machine learning model may be used for identifying, at the second device, whether the signaling transmitted from the first device may be periodic or aperiodic.

In some examples of the method, apparatuses, and non-transitory computer-readable medium described herein, the information includes a first parameter corresponding to a frequency component and a second parameter corresponding to an energy threshold.

In some examples of the method, apparatuses, and non-transitory computer-readable medium described herein, the machine learning model includes a random forests model or a deep neural network-based model.

In some examples of the method, apparatuses, and non-transitory computer-readable medium described herein, the information includes a quantity of layers included in the machine learning model, a respective quantity of neurons associated with each layer included in the machine learning model, and a set of multiple weights to be used for connecting each neuron included in the machine learning model.

In some examples of the method, apparatuses, and non-transitory computer-readable medium described herein, the traffic class corresponds to a type of application and the type of application includes an XR application, a gaming application, or a video conferencing application.

In some examples of the method, apparatuses, and non-transitory computer-readable medium described herein, the first device and the second device include stations (STAs).

BRIEF DESCRIPTION OF THE DRAWINGS

FIGS. 7 and 8 each illustrate an example of a process flow that supports traffic identification using machine learning in accordance with one or more aspects of the present disclosure.

FIGS. 14 and 15 illustrate flowcharts showing methods that support traffic identification using machine learning in accordance with one or more aspects of the present disclosure.

DETAILED DESCRIPTION

Figure 1:
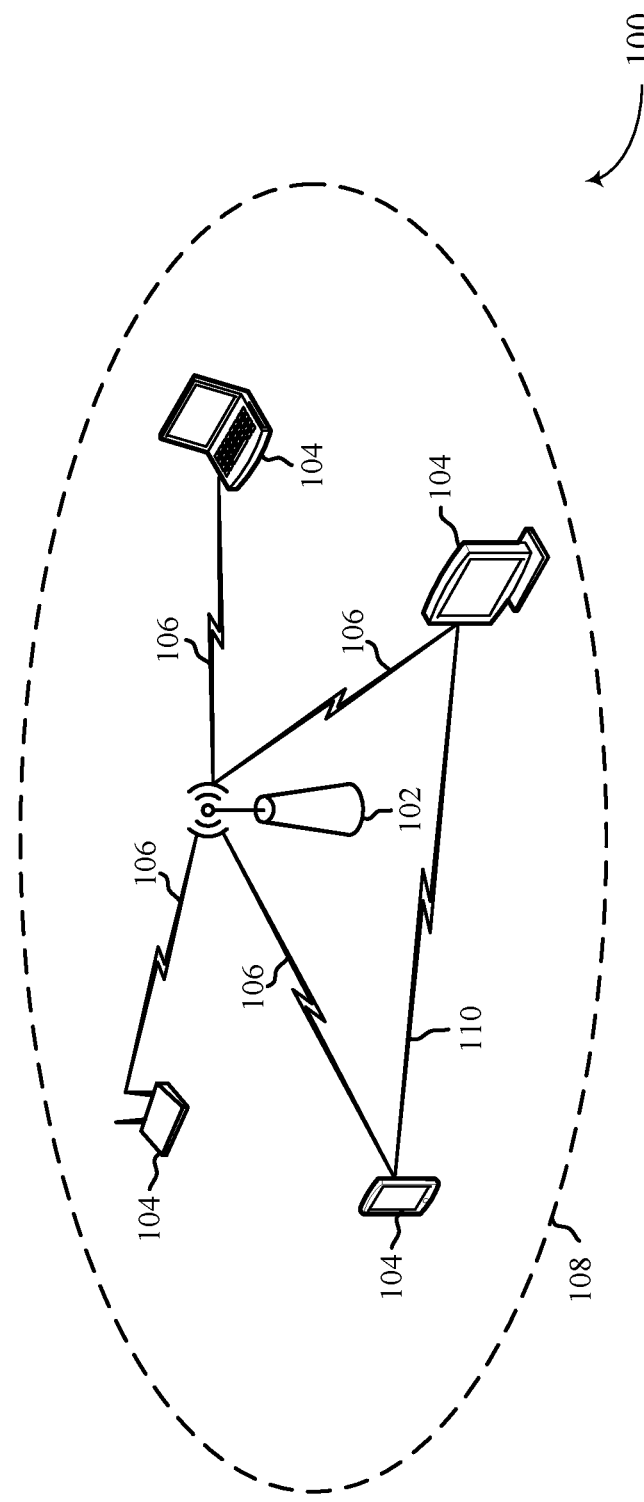
FIGS. 1 and 2 each illustrate an example of a wireless communications system that supports traffic identification using machine learning in accordance with one or more aspects of the present disclosure.

Some wireless communications systems may support devices capable of transmitting and receiving radio frequency (RF) signals according to one or more of Institute of Electrical and Electronics Engineers (IEEE) 802.11 standards, IEEE 802.15 standards, Bluetooth® standards as defined by the Bluetooth Special Interest Group (SIG), or Long Term Evolution (LTE), 3G, 4G or 5G (New Radio (NR)) standards promulgated by the $3^{rd}$ Generation Partnership Project (3GPP), among others. For example, such device may be capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. In some examples, the devices may be capable of supporting wireless communication protocols or RF signaling suitable for use in one or more of a wireless personal area network (WPAN), a wireless local area network (WLAN), a wireless wide area network (WWAN), a wireless metropolitan area network (WMAN), or an internet of things (IOT) network, among other examples.

In some wireless communications systems, a device (e.g., a station (STA) or an access point (AP)) may use machine learning to identify a traffic class associated with signaling received at the device. In some examples, a traffic class may refer to a type of software application from which traffic is generated, such as a gaming application or a video conferencing application, among other examples. Additionally, or alternatively, a traffic class may refer to a type of communication (e.g., ultra-reliable low latency communication (URLLC), enhanced mobile broadband communication (eMBB)). In some examples, a traffic class may refer to a type of traffic associated with internet of things (IoT) communications, such as industrial IoT. In some examples, the device may use the identified traffic class to perform various operations. For example, some traffic classes may be associated with periodic traffic, while other traffic classes may be associated with aperiodic traffic. In some examples, the device may determine that the traffic class associated with the received signaling is associated with periodic traffic, and the device may use the identified traffic class to align active durations (e.g., durations during which the device may be in an active state) with the periodicity of the traffic to conserve power. Additionally, or alternatively, the device may use the identified traffic class to identify suitable quality of service (QoS) parameters for the traffic.

In some examples, however, traffic classification performed using a machine learning model may be constrained by traffic classes used to train the machine learning model. That is, the machine learning model may be capable of classifying traffic into a traffic class used to train the machine learning model. In such an example, if the device receives signaling associated with a traffic class unknown to the machine learning model (e.g., a traffic class that the machine learning model has not been trained on), the machine learning model may inaccurately classify traffic transmitted via the signaling. That is, the machine learning model may assign a known traffic class to the signaling irrespective of whether the traffic class associated with the signaling is known to the machine learning model, which may reduce a performance of the device. Improved techniques, such as those described herein, may therefore enhance wireless communications through efficient and accurate identification of traffic classes (and corresponding applications) using machine learning techniques.

In some examples, the device may support a framework for determining whether a traffic class is known to a machine learning model. For example, according to techniques for traffic identification using machine learning, as described herein, the device may use a multi-step framework for determining whether a traffic class is known to the machine learning model used at the device. For instance, the device may train the machine learning model using traffic classes associated with periodic traffic. As such, during a first step of the multi-step framework, the device may determine whether traffic transmitted via signaling received at the device is periodic or aperiodic. If the traffic class is associated with periodic traffic, the traffic class may be known to the machine learning model. In some examples, the device may use a set of features obtained from the traffic to determine whether the traffic is periodic. The set of features may include a quantity of packets, a statistic based on the quantity of packets, or a statistic based on an inter-arrival time, among other examples of features.

In some examples, during a second step of the multi-step framework and based on determining that the traffic is periodic, the device may use a first machine learning model to determine whether the traffic class is known. For example, the device may use the first machine learning model to obtain a reconstruction of the set of features. In such an example, the device may determine a loss associated with the reconstruction (e.g., a difference between the reconstruction of the set of features and the set of features). In some examples, if the loss associated with the reconstruction satisfies a threshold, the device may determine that the traffic class is known to the first machine learning model. In response to determining that the traffic class is known to the first machine learning model, the device may use a second machine learning model (e.g., a same machine learning model or a different machine learning model) to identify an application associated with the signaling. For example, during a third step of the multi-step framework, the device may use a second machine learning model to obtain a prediction of an application associated with the signaling. In some examples, the second machine learning model may correspond to a multi-class classifier. Here, the device may input the set of features into the multi-class classifier to obtain the prediction of the application associated with the signaling. In some examples, identifying whether the traffic class is known to a machine learning model used at the device may increase an accuracy of predictions obtained using the machine learning model, among other possible benefits.

Aspects of the disclosure are initially described in the context of a wireless communications system. Aspects of the disclosure are also described in the context of a data generation procedure, an inference procedure, timing diagrams, a traffic classification procedure, and process flows. Aspects of the disclosure are further illustrated by and described with reference to apparatus diagrams, system diagrams, and flowcharts that relate to traffic identification using machine learning FIG. 1 illustrates an example wireless communications system 100 that supports traffic identification using machine learning in accordance with one or more aspects of the present disclosure. According to some aspects, the wireless communications system 100 can be an example of a WLAN such as a Wi-Fi network. For example, the wireless communications system 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The wireless communications system 100 may include numerous wireless communication devices such as a wireless AP 102 and multiple wireless STAs 104. While only one AP 102 is shown in FIG. 1, the wireless communications system 100 also can include multiple APs 102. AP 102 shown in FIG. 1 can represent various types of APs including but not limited to enterprise-level APs, single-frequency APs, dual-band APs, standalone APs, software-enabled APs (soft APs), and multi-link APs. The coverage area and capacity of a cellular network (such as LTE or 5G NR can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets (e.g., devices associated with XR applications, which may include augmented reality (AR), virtual reality (VR), mixed reality (MR), among other examples), wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communications system 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the wireless communications system 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the wireless communications system 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the wireless communications system 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some deployments, the wireless communications system 100, or devices of the wireless communications system 100, may support a framework for determining whether a traffic class is known to a machine learning model. In some examples, a first device (e.g., an AP 102, a STA 104) may receive signaling associated with a traffic class from a second device (e.g., another AP 102, another STA 104). In some examples, the first device may determine that the traffic class is included in a set of known traffic classes based on a set of features associated with the signaling. For example, the set of features may include a quantity of data packets, a statistic based on the quantity of data packets, a size associated with the data packets, or a statistic based on an inter-arrival time associated with the quantity of data packets, among other examples of features. In response to determining that the traffic class is included in the set of known traffic classes, the first device may use a machine learning model to obtain a prediction of an application associated with the signaling. In some examples, the prediction may be based on the set of features. For example, the machine learning model may be an example of a multi-class classifier capable of predicting an application based on the set of features. The machine learning model may be trained at the first device or the second device. For example, the first device may receive information associated with the machine learning model from the second device. In some examples, by transmitting the information associated with the machine learning model to the first device, the second device may reduce latency and increase a reliability of communications between the first device and the second device, among other possible benefits.

Figure 2:
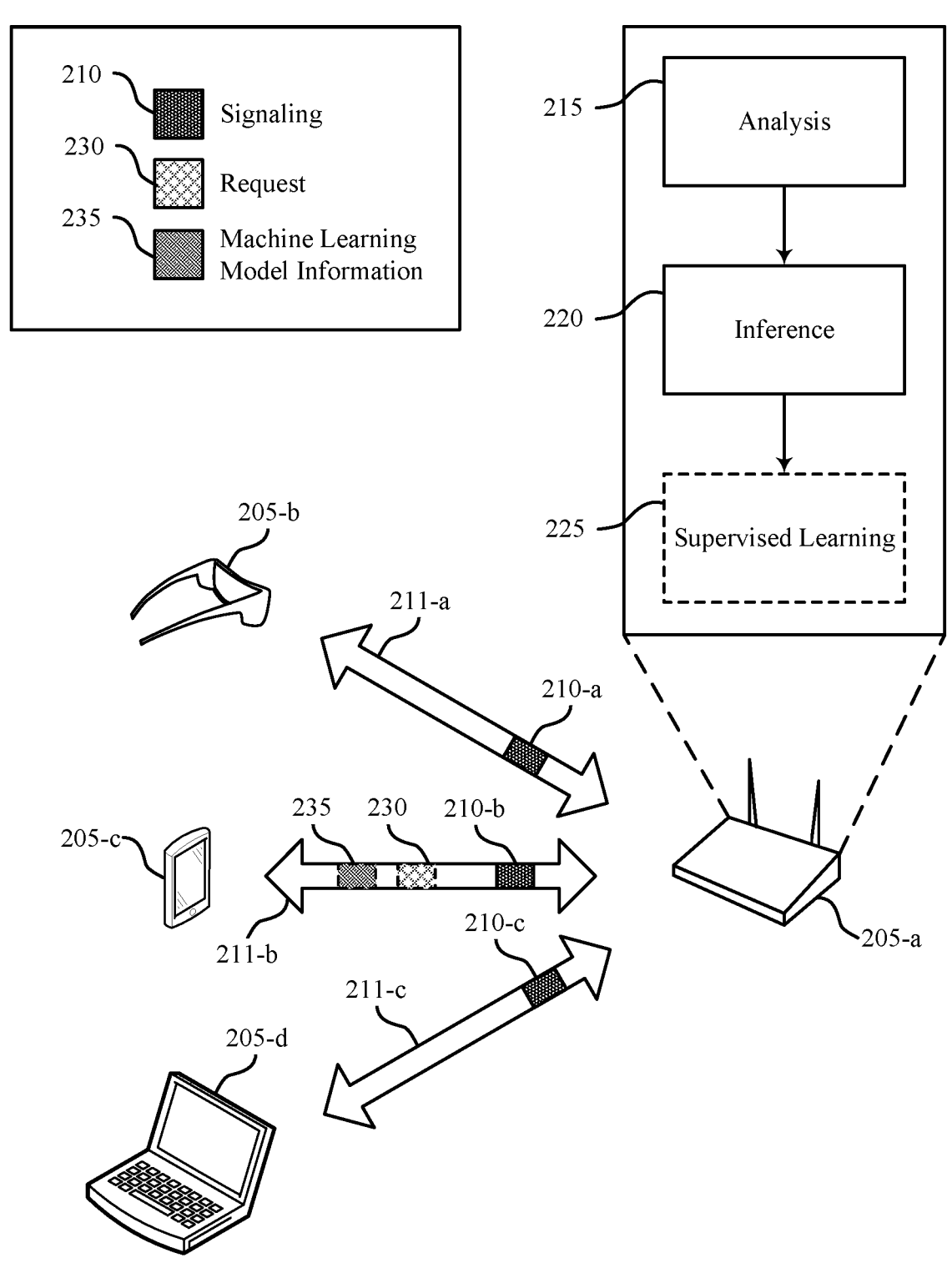

FIG. 2 illustrates an example of a wireless communications system 200 that supports traffic identification using machine learning in accordance with one or more aspects of the present disclosure. The wireless communications system

200 may implement or be implemented at one or more aspects of the wireless communications system 100. For example, the wireless communications system 200 may include a device 205-*a*, which may be an example of an AP 102 as described with reference to FIG. 1. The wireless communications system 200 may also include a device 205-*b*, a device 205-*c*, and a device 205-*d*, which may each be an example of a STA 104 (e.g., a non-AP STA) as described with reference to FIG. 1. The devices 205 may communicate using one or more communication links 211 (e.g., a communication link 211-*a*, a communication link 211-*b*, and a communication link 211-*c*), which may be examples of a communication link 106, as described with reference to FIG. 1. The wireless communications system 200 may include features for improved communications between the devices 205, among other possible benefits.

In some examples of the wireless communications system 200, the devices 205 may support traffic classification using machine learning models. A machine learning model may be specified using an input (X), an output (Y), and an underlying function (e.g., Y=f(X)). For example, a machine learning model may output an uplink modulation and coding scheme (MCS) index (e.g., Y=MCS index) based on some input (X), which may include a received signal strength indicator (RSSI), a packet detection rule (PDR), a quantity of overlapping basic service sets (OB SS s), among other examples of input for a machine learning model. In some examples, a machine learning model may be trained using information sets (e.g., data sets). For example, a machine learning model may learn a mapping of a function (e.g., f:X→Y) from a data set (e.g., D={X, Y}). That is, a machine learning model may correspond to a function approximator. The devices 205 may support multiple (e.g., different) machine learning paradigms to perform multiple (e.g., different) tasks. For example, the devices 205 may support multiple machine learning paradigms, such as supervised learning, unsupervised learning, and reinforcement learning, among other examples.

In some examples of supervised learning, a machine learning model (e.g., a neural network, a decision tree, a support vector machine (SVM)) may use an annotated data set, such as labeled images, to learn a mapping between the data set and labels. Data collection for supervised learning may occur offline. For example, collection of annotated data to be input into the machine learning model may be an offline process. The devices 205 may use reinforcement learning to perform a task, such as learning a policy based on a given set of states, actions, and rewards. For example, the devices 205 may use reinforcement learning to obtain a mapping from a state to an action. That is, in some examples of reinforcement learning, an agent may interact with an environment and the interaction may include the agent performing actions to increase rewards and learn a policy (e.g., learn a mapping from a state to an action). For example, the agent may learn the policy through experience, such as by taking or performing an action and observing rewards or updates to states. Examples of reinforcement learning models may include deep Q networks (DQNs), policy gradients, actor-critic techniques, contextual multi-armed bandits (MABs), or context-less MABs, among other examples. In some examples of unsupervised learning, such as clustering, a machine learning model may be used to identify (e.g., find, determine) a pattern and obtain insights (e.g., based on the identified pattern). For example, the devices 205 may perform unsupervised learning for finding patterns and insights using an unannotated data set (e.g., a data set that may not be annotated).

In some examples, the devices 205 may use autoencoders for unsupervised learning. Autoencoders may learn an encoded representation of input data. For example, autoencoders may include artificial neural networks (ANN) in the unsupervised learning context to reconstruct input data at the output (e.g., of the autoencoder). In some examples, autoencoders may use unlabeled data. For example, a label for the input data may be the input data itself. In some examples, the devices 205 may use the reconstruction loss as a metric to train the autoencoder. For example, an ANN (e.g., the autoencoder) may be trained until the reconstruction loss reduces to a small enough value. As described herein, reconstruction loss may refer to a difference between data input in to an autoencoder and a reconstruction of the data output from the autoencoder. In some examples, the devices 205 may use an autoencoder for data compression. That is, an encoded representation of a data set (e.g., obtained from an autoencoder) may be used for compression. In such examples, multiple (e.g., two) entities may exchange the encoded representation (e.g., instead of input). For example, the device 205-*a* may determine to compress a data set to be transmitted to the device 205-*b*. In such an example, the device 205-*a* may input the data set into an autoencoder and transmit an encoded representation of the data set output from the autoencoder to the device 205-*b*, thereby reducing overhead. Additionally, or alternatively, the devices 205 may use an autoencoder for anomaly detection. For example, normal data may have a relatively low reconstruction loss, while anomalous data may have relatively high reconstruction loss. As such, the devices 205 may use a reconstruction loss between a data set input into an autoencoder and a reconstruction of the data set output, that is from the autoencoder to determine whether the data set may be normal or anomalous.

A network entity (e.g., one or more of the devices 205) may determine to identify traffic that flows through the network entity. That is, the network entity may determine to identify a type of traffic (e.g., a traffic class), associated with signaling transmitted from the network entity or received at the network entity. For example, the device 205-*a* may determine to identify a traffic class associated with signaling 210-*a* communicated between the device 205-*a* and the device 205-*b*. In some examples, the device 205-*a* (e.g., a Wi-Fi AP) may determine to identify whether the signaling 210-*a* may be associated with real-time traffic (e.g., interactive traffic, traffic associated with two-way interactions), such that the device 205-*a* may assign suitable QoS parameters to the flow (e.g., the flow of data traffic associated with the signaling 210-*a*). Additionally, or alternatively, the device 205-*c* (e.g., a Wi-Fi client, a non-AP device) may determine to identify whether the signaling 210-*b* is associated with real-time traffic, such that the device 205-*c* may conserve power. Real-time traffic may include traffic that is associated with a periodicity, and the device 205-*c* may align active durations (e.g., 'ON' durations, durations during which the device 205-*c* may be in an 'ON' state) with the periodicity of the real-time traffic to conserve power. That is, the device 205-*c* may identify whether the signaling 210-*b* is associated with periodic traffic, such that the device 205-*c* may periodically switch components (e.g., radio frequency components) at the device 205-*c* to an 'ON' state to conserve power.

In some examples, information regarding generated traffic may be passed from applications (e.g., software platforms) to a networking stack through application programming interfaces (APIs). That is, an application (e.g., a server hosting an application) may use one or more APIs to communicate information (e.g., as QoS constraints, QoS parameters) regarding traffic generated for use of the application to a protocol stack associated with one or more of the devices 205 (e.g., a networking stack associated with a client device, a Wi-Fi stack). In some examples, however, APIs may be underutilized by some applications. For example, an application using a native platform may refrain from using an API. Additionally, or alternatively, information regarding the generated traffic may be unavailable in the downlink direction (e.g., due to communicating the information across multiple layers of the protocol stack). In such examples, schemes (e.g., techniques) for obtaining traffic information that do not rely on cross-layer information exchange may provide one or more benefits. For example, the devices 205 may use one or more schemes for autonomous traffic classification (e.g., traffic identification) based on machine learning, which may lead to reduced latency and increased performance, among other possible benefits.

In some examples, the devices 205 may use supervised learning for autonomous traffic classification. For example, the devices 205 may use supervised learning to obtain traffic information associated with signaling 210, such as whether the signaling 210 may be associated with a known traffic type (e.g., traffic class). That is, the devices 205 may use supervised learning for identification of known traffic classes. For example, the identification of known traffic classes may be an example of a supervised learning problem. In some examples, supervised learning may correspond to a machine learning task, which may be performed using multiple techniques. Additionally, or alternatively, supervised learning may include training of a machine learning model. For example, one or more of the devices 205 may select features to train a machine learning model (e.g., to be used at the respective device 205 or another device 205) and derive an inference (e.g., from the machine learning model). For example, one or more of the devices 205 may select a type of feature to be obtained (e.g., extracted) from data sets and used to train a machine learning model for supervised learning.

In some examples, however, some supervised learning techniques may lead to erroneous inference. For example, the identification of a traffic class (e.g., traffic classification) performed using a machine learning model may be constrained by traffic classes used to train the machine learning model. That is, one or more of the devices 205 may train a machine learning model using multiple traffic classes (e.g., multiple data sets that may each be associated with a respective traffic class). In such an example, the multiple traffic classes used to train the machine learning model may be known to the machine learning model (e.g., and the devices 205). That is, as described herein, traffic classes used to train a machine learning model may be referred to as known traffic classes. In some examples, however, the devices 205 may receive signaling associated with unknown traffic classes (e.g., traffic classes that the machine learning model is not trained on). In such an example, the machine learning model (e.g., a supervised learning model) may classify the received signaling as (e.g., may force the signaling to be classified as) one of the known traffic classes. That is, if the devices 205 receive signaling associated with an unknown traffic class, some machine learning models may erroneously assign a known traffic class to the received signaling, which may impact the performance of the devices 205.

As illustrated in the example of FIG. 2, the devices 205 may support a multi-step framework for determining whether a traffic class is known to a machine learning model.

For example, the devices 205 may use multiple steps to classify traffic (e.g., identify traffic). In some examples, the multi-step framework may include an analysis 215 (e.g., an initial analysis), an inference 220, and in some examples, supervised learning 225. For example, the device 205-*a* may receive signaling 210-*a* from the device 205-*b* during an observation window. In such an example, the device 205-*a* may use the multi-step framework to identify a traffic class associated with the signaling 210-*a*. For example, the device 205-*a* may perform a first step (e.g., Step-A) in which the device 205-*a* may perform the analysis 215 to filter undesired traffic. In some examples, the device 205-*a* may sample the signaling 210-*a* according to some sampling rate to obtain information regarding the traffic associated with the signaling 210-*a*. The information may correspond to a type of feature associated with data packets received at the device 205-*a* via the signaling 210-*a*. That is, the information may include a set of features that correspond to a type of feature, such as a quantity of data packets (e.g., received at the device 205-*a* via the signaling 210-*a*), a size of data packets, one or more statistics associated with the quantity of data packets, or one or more statistics associated with a packet inter-arrival time, or any combination thereof.

In such an example, the device 205-*a* may use an energy metric obtained from the set of features to determine whether the traffic associated with the signaling 210-*a* is periodic (e.g., real-time traffic) or aperiodic (e.g., non-real-time traffic). For example, the set of features may correspond to intervals during which the device 205-*a* obtains data packets (e.g., traffic, such as via the signaling 210-*a*) from the device 205-*b*. Accordingly, the set of features may be used to determine whether the traffic received from the device 205-*b* is periodic or aperiodic. In some examples, the device 205-*a* may determine that the traffic associated with the signaling 210-*a* is periodic if the energy metric obtained from the set of features satisfies a first threshold.

In some examples, the multi-step framework may include a second step (e.g., Step-B) in which the device 205-*a* may perform the inference 220. For example, using the inference 220, the device may identify whether the information (e.g., the data sample) may be associated with a known traffic class (e.g., a traffic class that the machine learning model is trained on) or an unknown traffic class. For instance, the device 205-*a* may use a first machine learning model to determine that the traffic class associated with the signaling 210-*a* is a known traffic class based on a reconstruction loss satisfying a second threshold. For example, the first machine learning model may be a neural network model (e.g., an autoencoder). The device 205-*a* may use the first machine learning model to determine the loss (e.g., a reconstruction loss) of the set of features. In some examples, the device 205-*a* may determine that the traffic class associated with the signaling 210-*a* is a known traffic class based on the loss satisfying the second threshold.

The device 205-*a* may perform (or adjust, modify) one or more operations based on a prediction of the machine learning model, such as based on determining that the traffic class associated with the signaling 210-*a* is a known traffic class. For example, the device 205-*a* may perform one or more operations in accordance with the traffic class and based on the traffic class being a known traffic class. In some examples, the device 205-*a* (e.g., an AP) may perform QoS provisioning, scheduling, or load balancing in accordance with the traffic class. Additionally, or alternatively, the device 205-*a* may support multi-link operations. In such examples, the device may determine a traffic identifier (TID)-to-link mapping using the traffic class. In some examples, the device 205-*a* may perform admission control in accordance with the traffic class. Additionally, or alternatively, the device may use the traffic class to predict user movement (e.g., head tracking or arm tracking for XR applications) associated with the device transmitting signaling associated with the traffic. For example, the device 205-*a* may use the traffic class to predict user movement associated with the device 205-*b* (e.g., a headset used with an XR application).

In some other examples, the device 205-*a* may determine to identify the traffic class or an application associated with the signaling 210-*a*. For example, the multi-step framework may include a third step (e.g., Step-C) in which the device 205-*a* may perform the supervised learning 225 using the information (e.g., the set of features). In some examples, a second machine learning model used for the supervised learning 225 may be a same (or different) machine learning model used for the inference 220. That is, the second machine learning model may be the same as (or different from) the first machine learning model. For example, based on the signaling being associated with a known traffic class, the device 205 may perform the supervised learning 225 to identify an application generating the traffic associated with the signaling 210-*a*. Although the example of FIG. 2 illustrates the analysis 215, the inference 220 and the supervised learning 225 being performed at the device 205-*a*, it is to be understood that the device 205-*b*, the device 205-*c*, and the device 205-*d* may also perform the analysis 215, the inference 220, and the supervised learning 225, or some combination thereof, to identify a traffic class. For example, the device 205-*a* may transmit signaling 210-*b* to the device 205-*c* during an observation window and the device 205-*c* may use the analysis 215, the inference 220, and the supervised learning 225 to identify a traffic class associated with the signaling 210-*b*. Additionally, or alternatively, the device 205-*a* may transmit signaling 210-*c* to the device 205-*d* (e.g., during a same or different observation window) and the device 205-*c* may use the analysis 215, the inference 220, and the supervised learning 225 to identify a traffic class associated with the signaling 210-*c*.

Additionally, or alternatively, a machine learning model may be trained at one of the devices 205 and used at another one of the devices 205 for identifying a traffic class. For example, the device 205-*a* may train one or more machine learning models to be used at the device 205-*c* for identifying a traffic class (e.g., classifying traffic). That is, the device 205-*a* may offer trained models for the device 205-*c* to be download and used at the device 205-*c*. The trained models may be used at the device 205-*c* for traffic type identification (e.g., autoencoders for detecting XR applications) or application identification. For example, the trained models may include a random forests model or deep neural network model to be used for identifying applications, a differentiated services code point (DSCP), a user priority, an access category, or a TID. In some examples, the trained models may be used at the device 205-*c* for determining whether the signaling 210-*b* is associated with periodic or a aperiodic traffic (e.g., for periodic or aperiodic traffic classification). In such an example, the device 205-*a* may indicate, to the device 205-*c*, a threshold frequency ($\beta$) and a threshold energy metric ($\Gamma1$) to be used for the periodic or aperiodic traffic classification.

For example, the device 205-*a* (e.g., an AP) may offer downloadable identification or classification models to the device 205-*c* (e.g., or one or more other associated non-AP STAs) that support machine learning and the traffic classification. In such an example, the device 205-*a* may receive a request 230 for information associated with the machine learning model to be used at the device 205-*c* for classifying traffic. In response, the device 205-*a* may transmit a message indicating machine learning model information 235 to the device 205-*c*. In some examples, the machine learning model information 235 may include a quantity of layers included in the machine learning model, a respective quantity of neurons associated with each layer included in the machine learning model, and a set of multiple weights to be used for connecting each neuron included in the machine learning model. In some examples, the device 205-*c* (e.g., a recipient STA) may provide feedback to the device 205-*a* (e.g., a transmitting STA) on a performance of the model. Additionally, or alternatively, the device 205-*a* may identify that the device 205-*c* is using incorrect parameters for ongoing traffic. In such examples, the device 205-*a* may initiate an exchange of another (e.g., an alternate) machine learning model. Additionally, or alternatively, the device 205-*a* may disable a use for the machine learning model at the device 205-*c* (or a basic service set (BSS)). In some examples, the device 205-*a* may provide one or more machine learning models to the device 205-*c* during setup.

The device 205-*c* may use the machine learning model information 235 to obtain (e.g., build, construct, updated) the machine learning model for classifying traffic. For example, the device 205-*c* may identify a traffic class associated with the signaling 210-*b*. In such an example, the device 205-*c* (e.g., a non-AP STA, such as a client device) may perform one or more operations in accordance with the identified traffic class. For example, the device 205-*a* may determine to communicate with the device 205-*a* in accordance with (or based on) the identified traffic class. In such cases, the identified traffic class may be utilized to provide information regarding how device 205-*a* may efficiently communicate with device 205-*b*. In some examples, the device may support multi-link operations. In such examples, the device 205-*c* may determine one or more links (e.g., which links) the device 205-*c* may use in an active mode based on the identified traffic class. Additionally, or alternatively, the device 205-*c* may use the identified traffic class for determining power save patterns. For example, the device 205-*c* may use the identified traffic class to determine a time instance during which the device 205-*c* may enter a power saving mode. In some examples, the device 205-*c* may use the identified traffic class for a QoS request (e.g., the device may populate the QoS characteristics element during a stream classification service (SCS) setup based on the identified traffic class). Additionally, or alternatively, the device 205-*c* may perform a restricted target wake time (rTWT) setup (e.g., determine TWT parameter values) based on the identified traffic class. In some examples, the device 205-*c* may determine a channel access mechanism (e.g., whether to rely on a triggered channel access mechanism or an enhanced distributed channel access (EDCA) mechanism to deliver uplink traffic) based on the identified traffic class. Additionally, or alternatively, the device may predict user movement (e.g., movement of the device 205-*c* or a user operating the device 205-*c*) based on the identified traffic class. In some examples, using the machine learning model for classifying traffic may lead to increased performance at the device 205-*c* (e.g., increased accuracy of predicted user movement), among other possible benefits.

Figure 3:
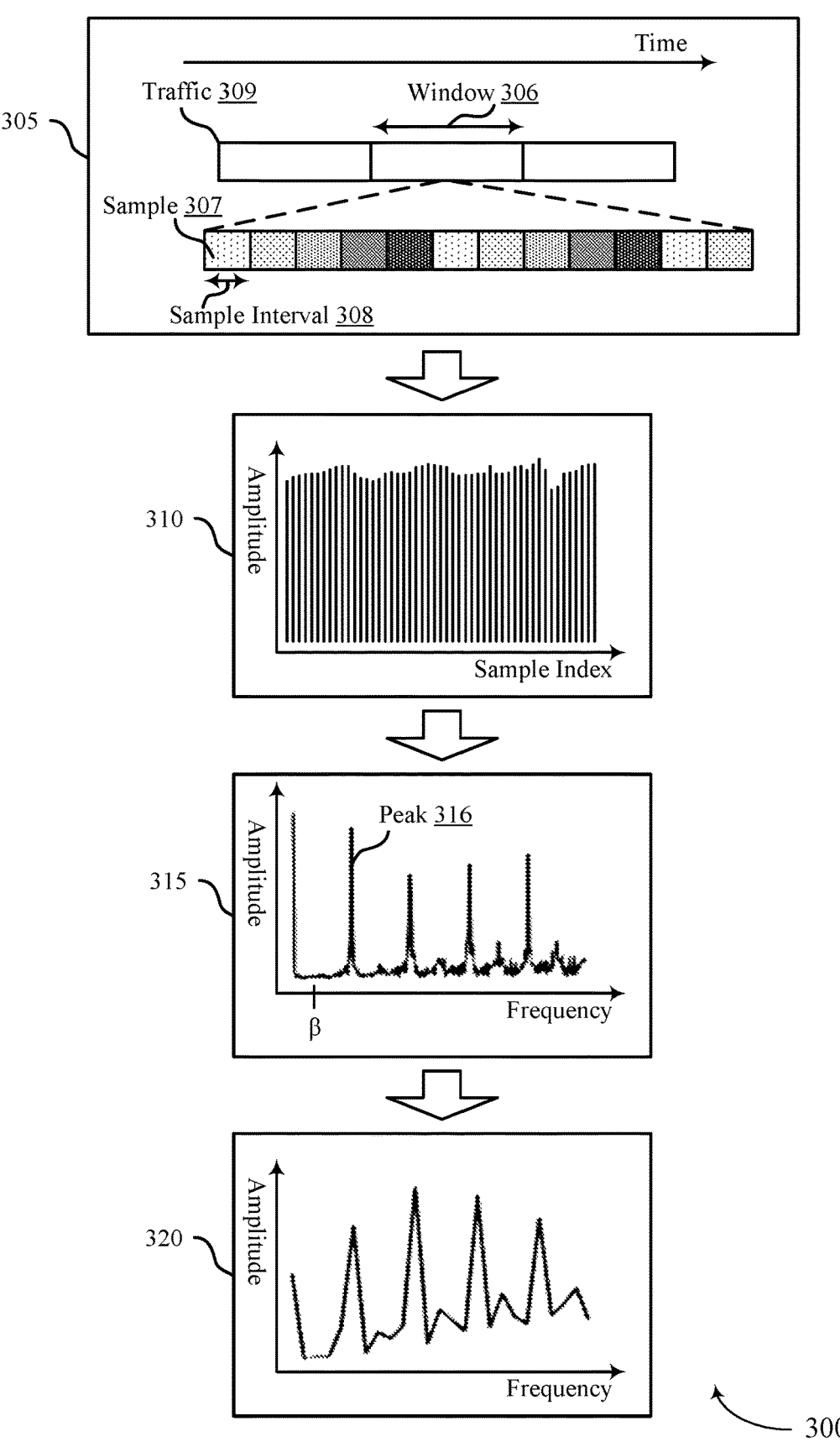
FIG. 3 illustrates an example of a data generation procedure that supports traffic identification using machine learning in accordance with one or more aspects of the present disclosure.

FIG. 3 illustrates an example of a data generation procedure 300 that supports traffic identification using machine learning in accordance with one or more aspects of the present disclosure. The data generation procedure 300 may implement or be implemented to realize or facilitate aspects of the wireless communications system 100 or the wireless communications system 200. For example, a device, which may be an example of an AP or a STA as illustrated by and described with reference to FIGS. 1 and 2, may use the data generation procedure 300 to identify a traffic class associated with signaling received at or transmitted from the device. In some examples, the device may implement the data generation procedure 300 to facilitate aspects of an analysis, an inference, or supervised learning, as described with reference to FIG. 2.

In some examples, the device may support one or more techniques for traffic identification using machine learning, as described herein. For example, in accordance with such techniques, the device may use a multi-step framework (e.g., a three-step framework) to identify traffic associated with signaling received at (or transmitted from) the device. That is, to identify traffic, the device may use an analysis, an inference, and supervised learning, which may be examples of the corresponding processes as described with reference to FIG. 2. In some examples, as part of (or to facilitate) the analysis, the inference, or the supervised learning, the device may generate information (e.g., input data for an autoencoder) using a frequency domain representation. For example, the device may sample incoming traffic (e.g., traffic 309) in a time domain to generate input data (e.g., an information set) for an autoencoder (e.g., a machine learning model used to for traffic identification). As shown in a timing diagram 305, the device may obtain (e.g., measure, identify, calculate) information associated with the traffic 309 during a window 306 (e.g., an observation window, which may correspond to about 1.024 seconds or some other suitable duration). For example, the device may exchange information (e.g., data packets) with another device (e.g., an application server) via signaling. In such an example, a quantity of data packets exchanged between the device and the application server during a time interval (e.g., a given time instance) may be referred to as data traffic, or more simply, traffic. As such, the device may sample the signaling received at the device (e.g., the traffic 309) during one or more sampling intervals within the window 306 to obtain information associated with the traffic 309.

In some examples, to generate the information set, the device may sample the signaling according to a sampling rate. For example, the duration (e.g., about 2 ms or some other suitable duration) of the sample interval 308 may be based on a sampling rate. Accordingly, a size of a sample 307 obtained during the sample interval 308 may also be based on the sampling rate. In some examples, the sampling rate may be relatively high, such as to prevent aliasing (e.g., sampling rate may be greater than a periodicity associated with the signaling). In some examples, the information obtained during each sample interval (e.g., the information included in the sample 307) may correspond to a type of feature, such as a quantity of data packets (e.g., received via the signaling), a packet size (e.g., an aggregate packet size) associated with the data packets, one or more statistics associated with the quantity of data packets, or one or more statistics associated with a packet inter-arrival time of data packets received at the device via the signaling. That is, a quantity sampled by the device during each sample interval may include a packet size or a quantity of data packets, or some other suitable type of feature. For example, the device may determine a quantity of data packets included in the sample 307 (e.g., received during the sample interval 308) or a packet size associated with one or more data packets included in the sample 307. That is, the device may perform sampling during the window 306 to obtain an information set which may correspond to a set of features.

As shown in a sample index diagram 310, the device may determine (e.g., compute, extract) one or more types of features for each sample included in the window 306 (e.g., including the sample 307). For example, if the window 306 corresponds to a duration of about 1.024 seconds (s) and the sample interval 308 corresponds to about 2 ms, the device may obtain about 512 samples across 512 sample intervals. In such an example, the device may determine one or more types of features, such as an aggregate packet size (e.g., in units of bytes), for each sample. In some examples, the device may determine a distribution of a determined feature (e.g., the aggregate packet size) across the sample intervals from which the samples were obtained. For example, each sample may correspond to a respective sample index and the device may determine the distribution of each feature (e.g., a distribution of an amplitude of each feature type) across the sample indices included in the window 306. For instance, the device may determine the distribution of the aggregate packet size across the 512 sample intervals during which the 512 samples may have been obtained (e.g., in the time domain).

In some examples, the device may translate the distribution of the feature in the time domain (e.g., as shown in the sample index diagram 310) to a distribution of the feature in the frequency domain (e.g., a first frequency domain representation). For example, as shown in a frequency diagram 315, the device may translate the obtained information set (e.g., the sample data) to the frequency domain using a fast Fourier transform (FFT). That is, the device may perform an FFT of the information set obtained in the time domain (e.g., the distribution of the feature across the sample indices). In some examples, the frequency diagram 315 may illustrate a periodicity (or an aperiodicity) of the information set. For example, if the device receives data packets (e.g., via the signaling) according to a periodicity (e.g., during every tenth sample interval included in the window 306 or some other suitable periodicity) the first frequency domain representation of the determined feature (e.g., aggregate packet size) may illustrate an increased amplitude (e.g., a peak) at a frequency that corresponds to the periodicity. That is, if the traffic 309 is periodic, the first frequency domain representation may illustrate a peak at a frequency corresponding to the periodicity of the traffic. As illustrated in the frequency diagram 315, the first frequency domain representation may illustrate a peak 316 at a frequency corresponding to the periodicity of the traffic 309, and one or more other frequencies that may correspond to harmonics of the frequency. For example, if the device receives data packets with a periodicity of about 20 ms, the peak 316 may occur at a frequency of about 50 Hz (e.g., and the other peaks may occur at harmonics of about 50 Hz).

In some examples, a first step (e.g., Step-A) of the multi-step framework used to identify traffic associated with signaling received at the device may include an analysis. For example, the device may perform an analysis in which the device may discard undesired traffic types. For instance, latency associated with real-time traffic may have an increased impact on a performance of the device relative to a latency associated with non-real-time traffic. Accordingly, detection of non-real-time traffic (e.g., non-real-time applications) may not be desired or may be less desirable than detection of real-time traffic. In such an example, a machine learning model used at the device for traffic identification may be trained using real-time traffic and, as such, the device may refrain from attempting to using the machine learning model to classify non-real-time traffic. For example, the device may perform an analysis to determine whether signaling received at the device corresponds to a real-time traffic class. In some aspects, real-time traffic may relate to traffic that is bi-directionally interactive and is associated with dynamic information being sent between the transmitter and the receiver based on the interactions (e.g., two-way interaction). Such real-time traffic may include, for example, traffic associated with gaming or other applications, where data provided to a recipient may be variable based on the recipient's input (e.g., a user's actions within a gaming application may have an effect on a game environment, and therefore on the information received). Non-real-time traffic may relate to traffic that is relatively one-way, where a recipient has relatively little or no interaction and/or impact on the information being received, such as for applications that enable or support data broadcast to multiple devices (e.g., a live stream).

In some examples, real-time traffic classes may correspond to periodic traffic classes, which may have relatively high energy in non-direct current (DC) components of a frequency domain representation. For example, the frequency domain representation of real-time traffic may include peaks at or above a threshold frequency. Additionally, or alternatively, a frequency domain representation of aperiodic traffic classes may have relatively high energy in DC components. For example, the frequency domain representation of non-real-time traffic may include one or more peaks below the threshold frequency. Accordingly, in some examples, the device may determine whether traffic is periodic or aperiodic based on an energy metric. For example, the device may use the energy metric defined in accordance with the following Equation 1:

$$\Delta = \frac{\text{Energy in DC components}}{\text{Energy in non-DC components}} \quad (1)$$

in which the $\Delta$ may correspond to the energy metric. In such an example, real-time traffic classes (e.g., periodic traffic classes) may have a relatively small A, while non-real-time classes may have a relatively high A. Accordingly, the device may use an inference algorithm (e.g., based on the energy metric) to determine whether traffic associated with the signaling corresponds to real-time traffic or non-real-time traffic. For example, the device may determine (e.g., measure, calculate) whether the energy metric $\Delta$ for observed samples (e.g., for the first frequency domain representation) satisfies a first threshold ($\Gamma 1$). In such an example, if $\Delta$ fails to satisfy the first threshold (e.g., if $\Delta > \Gamma 1$), the device may determine that the traffic 309 is aperiodic (e.g., corresponds to a non-real-time traffic class, which may be an unknown traffic class). Additionally, or alternatively, if $\Delta$ satisfies the first threshold (e.g., if $\Delta < \Gamma 1$), the device may determine that the traffic 309 is periodic (e.g., may correspond to a real-time traffic class, which may be a known traffic class).

In some examples, the device may perform a training procedure to determine the first threshold. For example, the energy metric $\Delta$ may be based on the threshold frequency. For example, the energy metric may be determined in accordance with the following Equation 2:

$$\Delta(\beta) = \frac{\text{Energy in } [0 - \beta]\text{Hz}}{\text{Energy in } \beta \text{ Hz and above } \beta \text{ Hz}} \quad (2)$$

in which $\beta$ may correspond to the threshold frequency (e.g., about 20 Hz or some other suitable frequency). In such an example, the device may select $\beta$ (e.g., the threshold frequency, a hyperparameter) and compute values of the energy metric ($\Delta(\beta)$) for real-time traffic and for non-real-time traffic. The device may determine the first threshold ($\Gamma 1$) based on a difference between a first value of the energy metric computed for real-time traffic and a second value of the energy metric computed for non-real-time traffic. For example, the device may select the first threshold (e.g., about 0.17 or some other suitable value), such that $\Delta(\beta)$ values which satisfy the first threshold may correspond to values associated with real-time traffic and $\Delta(\beta)$ values which fail to satisfy the first threshold may correspond to values associated with non-real-time traffic values. That is, the device may select a first a threshold for $\Delta(\beta)$ that separates real-time traffic and non-real-time traffic.

In some examples, the device may (e.g., optionally) perform post-processing of the first frequency domain representation. For example, the device may reduce a resolution of the first frequency domain representation (e.g., the frequency diagram 315, an FFT plot) using binning and normalization to obtain a second frequency domain representation, as illustrated using a frequency diagram 320, which may correspond to a relatively reduced quantity of data points. In some examples, the device may perform binning according to a bin width (e.g., a hyperparameter). In such examples, the quantity of data points corresponding to the second frequency domain representation (illustrated using the frequency diagram 320) may be based on the bin width used for the binning. The device may use the reduced quantity of data points (e.g., binned features, a set of features) as input for one or more subsequent steps of the multiple steps used to identify traffic. In some examples, the device may perform the binning and normalization to reduce a complexity (e.g., size) of the machine learning model. For example, to determine whether a set of data generated without the binning and normalization is associated with a known traffic class, the machine learning model may use a relatively large quantity of neurons or hidden layers. Alternatively, to determine whether a set of data generated with binning and normalization is associated with a known traffic class, the machine learning model may use a relatively small quantity of neurons or hidden layers.

Figure 4:
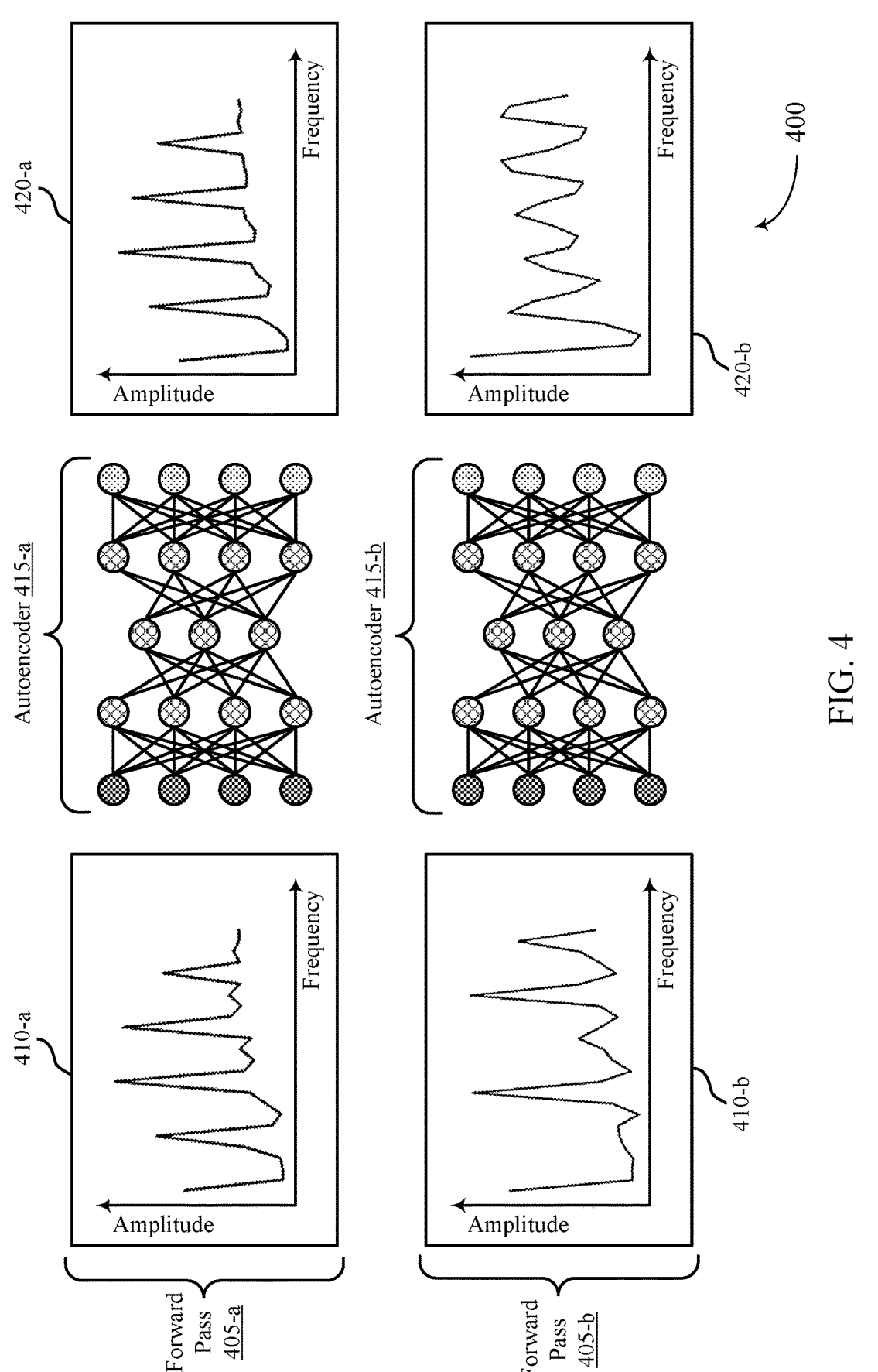
FIG. 4 illustrates an example of an inference procedure that supports traffic identification using machine learning in accordance with one or more aspects of the present disclosure.

FIG. 4 illustrates an example of an inference procedure 400 that supports traffic identification using machine learning in accordance with one or more aspects of the present disclosure. The inference procedure 400 may implement or be implemented to realize or facilitate aspects of the wireless communications system 100, the wireless communications system 200, or the data generation procedure 300. For example, a device, which may be an example of an AP or a STA as illustrated by and described with reference to FIGS. 1 through 3, may use the inference procedure 400 to determine whether a traffic class associated with signaling received at or transmitted from the device may correspond to a known traffic class. For example, the device may implement the inference procedure 400 to facilitate aspects of an inference as described with reference to FIG. 2.

In some examples, the device may use a set of features (e.g., a frequency domain representation of sample data) to train machine learning models, such as autoencoders. In some examples, to train an autoencoder, the device may generate input data from traffic received at the device via signaling. For example, the device may generate input data (e.g., a data set) through sampling the signaling received at the device during an observation window that may include multiple sample intervals. In some examples, the device may train an autoencoder using data from a desired traffic type. For example, the device may train the autoencoder using data sets obtained from sampling signaling associated with periodic traffic. In some examples, the device may use frequency domain data to train the autoencoder. That is, a data set used to train the autoencoder may correspond to a distribution of a feature (e.g., an aggregate packet size) across the multiple sample intervals.

During a training instance, which may be referred to as an epoch, the machine learning model may compute a reconstruction loss for a data set and backpropagate a gradient associated with the machine learning model to reduce (e.g., minimize) the reconstruction loss. In some examples, the device may use a trained autoencoder to select a threshold reconstruction loss for detecting a traffic class. That is, the device may use a trained autoencoder to determine whether signaling received at (or transmitted from) the device may correspond to a known traffic class. In some examples, the device may use the trained autoencoder to select a threshold reconstruction loss ($\Gamma 2$) for detecting a traffic class (e.g., a desired traffic class, such as a real-time traffic class). The device may determine that an autoencoder is trained based on a reconstruction loss between a data set input in to the autoencoder and a reconstruction of the data set output from the autoencoder. For example, a trained autoencoder may be associated with (e.g., imply) a reconstruction loss that is sufficiently small. That is, an autoencoder trained for a traffic class may output a reconstruction of a data set corresponding to the traffic class with a relatively low (e.g., sufficiently small) reconstruction loss.

In some examples, the device may select the threshold reconstruction loss ($\Gamma 2$) based on a distribution of reconstruction loss across multiple data sets used to train the autoencoder. For example, the device may select a value for the threshold reconstruction loss that corresponds to a percentile (e.g., the 99th percentile or some other suitable percentile) of the reconstruction loss across the multiple data sets used to train the autoencoder. That is, the percent (e.g., 99 percent or some other suitable percent) of data sets used to train the autoencoder may be associated with a reconstruction loss smaller than the selected threshold. In some examples, the percent (e.g., the threshold) may be selected based on a performance of the autoencoder.

As illustrated in the example of FIG. 4, the device may perform (e.g., make) an inference, in which the device may use the trained autoencoder (e.g., a frequency domain autoencoder) to detect traffic types. For example, in a second step (e.g., Step-B) of a multi-step framework used at the device for identifying traffic, the device may use one or more frequency domain autoencoders for detecting known traffic types. That is, the device may perform an inference in which the device may generate input data (e.g., a data set) from traffic and perform (e.g., make) a forward pass of the traffic data through the trained autoencoder. For example, the device may obtain (e.g., generate) a first data set (e.g., a first frequency domain representation of a feature) illustrated using a frequency diagram 410-*a* and a second data set (e.g., a second frequency domain representation of a feature) illustrated using a frequency diagram 410-*b*. The device may perform a forward pass 405-*a* in which the device may input the first data set into an autoencoder 415-*a*. The autoencoder 415-*a* may output a first reconstruction of the first data set, which may be illustrated using a frequency diagram 420-*a*. Additionally, or alternatively, the device may perform a forward pass 405-*b* in which the device may input the second data set into an autoencoder 415-*b*. The autoencoder

415-*b* may output a second reconstruction of the second data set, which may be illustrated using a frequency diagram 420-*b*.

In some examples, the device may determine (e.g., calculate) a first reconstruction loss associated with the first reconstruction (e.g., illustrated using the frequency diagram 420-*a*) and a second reconstruction loss associated with the second reconstruction (e.g., illustrated using the frequency diagram 420-*b*). That is, the device may compute the reconstruction loss for the forward pass 405-*a* and the forward pass 405-*b* and make an inference. In some examples, if the reconstruction loss satisfies the threshold reconstruction loss (e.g., is less than $\Gamma 2$) the device may determine that the traffic is of a known traffic class (e.g., a desired type). Otherwise, the device may determine that the traffic is of an unknown traffic class (e.g., an unknown type). For example, the device may determine that the first reconstruction loss satisfies the threshold construction loss and is therefore associated with a known traffic class. Additionally, or alternatively, the device may determine that the second reconstruction loss fails to satisfy the threshold reconstruction loss and is therefore associated with an unknown traffic class. In such an example, the device may use the first data set as input for one or more subsequent steps of the multiple steps used to identify traffic.

Figure 5A:
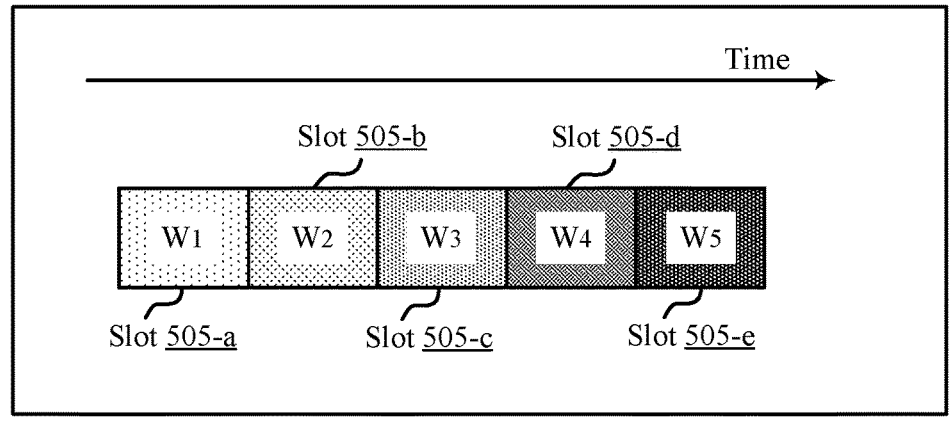
FIGS. 5A and 5B illustrate examples of timing diagrams that support traffic identification using machine learning in accordance with one or more aspects of the present disclosure.
Figure 5B:
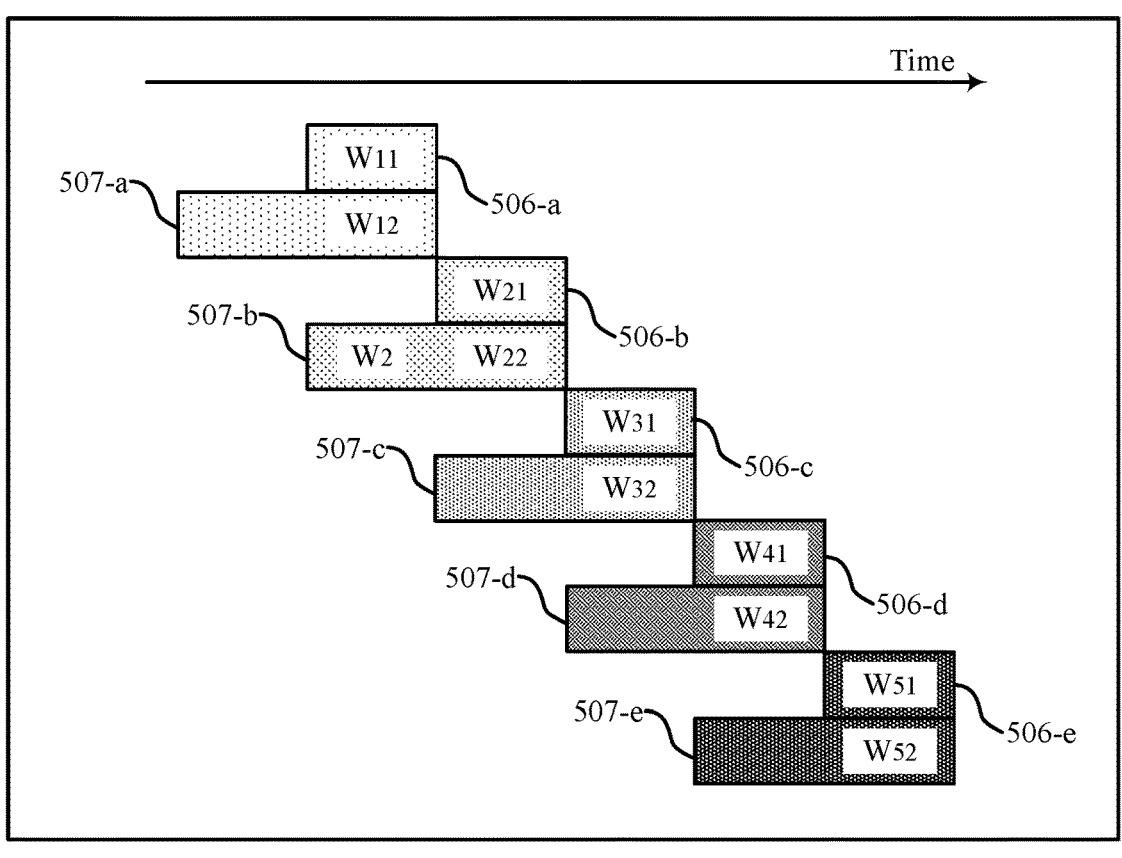

FIGS. 5A and 5B illustrate examples of timing diagrams 500 that support traffic identification using machine learning in accordance with one or more aspects of the present disclosure. The timing diagrams 500 (e.g., a timing diagram 500-*a* and a timing diagram 500-*b*) may implement or be implemented to realize or facilitate aspects of the wireless communications system 100, the wireless communications system 200, the data generation procedure 300, or the inference procedure 400. For example, a device, which may be an example of an AP or a STA as illustrated by and described with reference to FIGS. 1 through 4, may use the timing diagrams 500 to facilitate supervised learning as described with reference to FIG. 2.

In some examples, the device may exchange information (e.g., data packets) with another device, such as an application server, via signaling. In such examples, it may be desirable for the device to predict an application generating the data packets exchanged between the device and the application server during a time interval (e.g., the traffic). For example, in addition to predicting whether the traffic corresponds to a known traffic class (e.g., whether the traffic is of type 'XR'), the device may determine to identify an application (e.g., an XR application) corresponding to the traffic. That is, subsequent to determining whether a data set (e.g., a set of features) is associated with a known traffic class (e.g., using an inference procedure as described with reference to FIG. 4) the device may use the data set for supervised learning. For example, the device may use the data set as input for a machine learning model (e.g., a multi-class classifier) to identify an application (e.g., obtain an application name) associated with the data set. Based on the identified application, the device may perform additional determinations, such as predicting user hand movement or headset tracking, among other possible types of determinations.

The data set may correspond to a set of features (e.g., a frequency domain representation of a feature). In some examples, multiple (e.g., separate) types of features may be used for downlink and uplink traffic. Additionally, or alternatively, features may be computed within one or multiple sample intervals (e.g., time slots). For example, features computed for two or more time slots may be combined (e.g., appended). Such features may be computed in a same window as may be used for computing the frequency domain representation (e.g., obtaining the data set). In some examples, features (e.g., and the frequency domain representation) may be computed per each internet protocol flow (i.e., a 5-tuple) generated by an application. Example features may include a quantity of packets, one or more statistics (e.g., operations, such as such as sum, maximum, median, mean, minimum, Xth percentile) associated with a packet size, or one or more statistics (e.g., operations, such as such as sum, maximum, median, mean, minimum, Xth percentile) associated with a packet inter-arrival time, or any combination thereof. That is, example features may include a quantity of packets, an aggregate packet size, a maximum packet size, a median packet size, a mean packet size, a minimum inter-arrival time, a mean inter-arrival time, or a median inter-arrival time, among other examples.

In some examples, the device may obtain a data set (e.g., raw internet protocol flow data) and filter (e.g., organize) the data set into time slots (e.g., tumbling slots). As illustrated in the example of FIG. 5A, the device may filter the data set into single time slots (e.g., a slot 505-*a*, a slot 505-*b*, a slot 505-*c*, a slot 505-*d*, and a slot 505-*e*). In such an example, the device may perform some processing and compute one or more features for the slots 505 (e.g., per each slot 505). That is, the device may calculate multiple sets of features for the slots 505 in which each set of features may correspond to a type of feature (e.g., an aggregate packet size) sampled from each of the slots 505. Additionally, or alternatively, the device may filter the data sets into multiple time slots. As illustrated in the example of FIG. 5B, the device may filter the data set into multiple time slots in which one of the multiple time slots may be overlapping with another time slot. For example, the device may filter the data into one or more slots 506 (e.g., a slot 506-*a*, a slot 506-*b*, a slot 506-*c*, a slot 506-*d*, and a slot 506-*e*) and one or more slots 507 (e.g., a slot 507-*a*, a slot 507-*b*, a slot 507-*c*, a slot 507-*d*, and a slot 507-*e*). In such an example, the device may perform some processing and compute one or more features for the slots 506 (e.g., per each slot 507) and the slots 507 (e.g., per each slot 507). For example, a first row of a data set to be input into the machine learning model may include features computed for a slot 506-*a* and a slot 507-*a* (e.g., features corresponding to Wii and Wiz). Additionally, a second row of the data set to be input into the machine learning model may include features computed for a slot 506-*b* and a slot 507-*b* (e.g., features corresponding to $W_{21}$ and $W_{22}$).

The device may input the data set into the machine learning model to identify a corresponding application. For example, the machine learning model may be trained using multiple data sets associated with multiple applications. In such an example, to training the machine learning model, the device may assign a label to computed features prior to inputting the computed features into the machine learning model. The label may indicate an application that generated the traffic from which the data set may have been sampled. That is, a training data set may be populated using features computed for each slot (e.g., the slots 505, the slots 506, the slots 507) and include a corresponding label. As such, the device may use the trained machine learning model to identify an application based on a set of features input into the machine learning model being compatible with features used to train the machine learning model.

Figure 6:
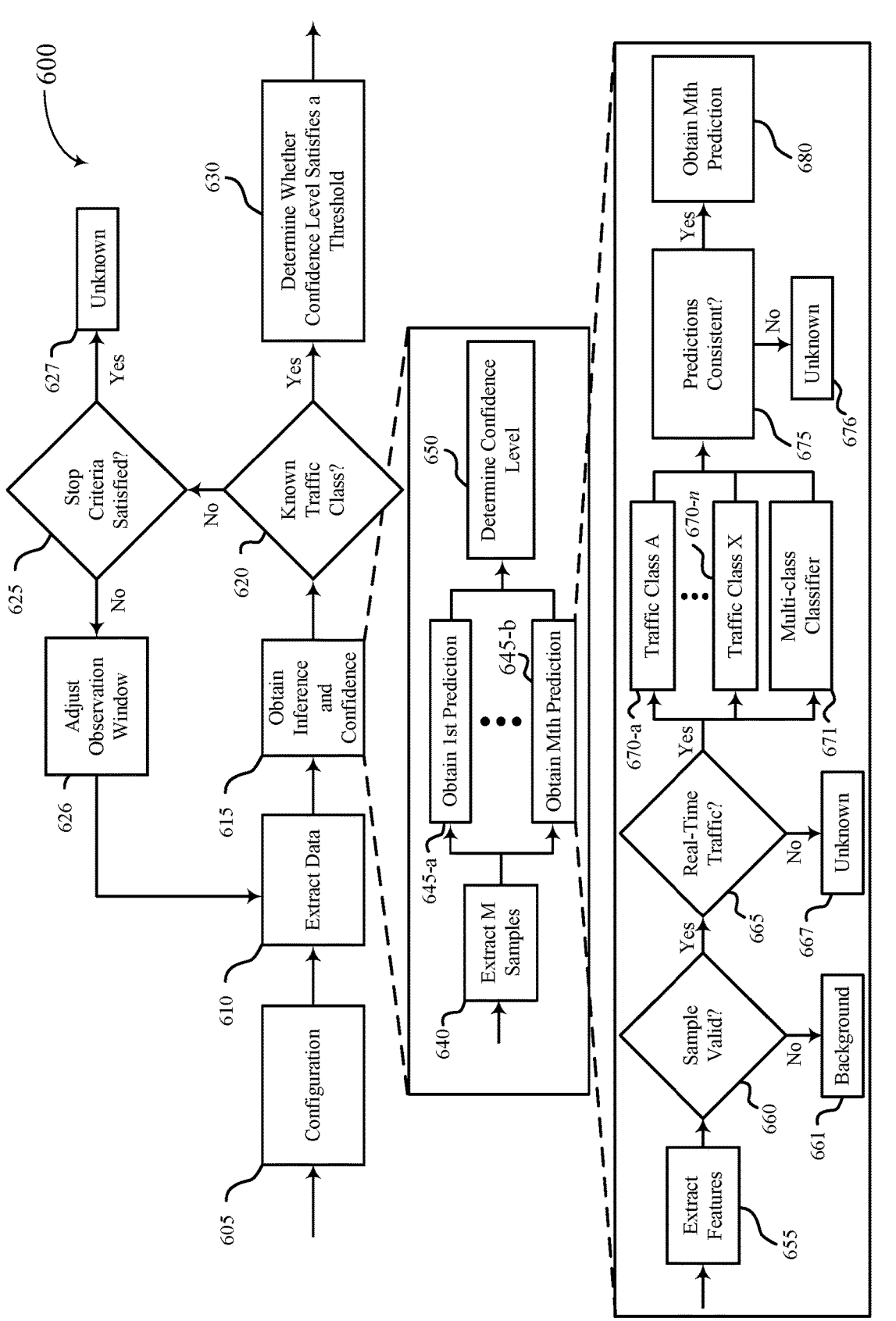
FIG. 6 illustrates an example of a traffic classification procedure that supports traffic identification using machine learning in accordance with one or more aspects of the present disclosure.

FIG. 6 illustrates an example of a traffic classification procedure 600 that supports traffic identification using machine learning in accordance with one or more aspects of the present disclosure. The traffic classification procedure 600 may implement or be implemented to realize or facilitate aspects of the wireless communications system 100, the wireless communications system 200, the data generation procedure 300, the inference procedure 400, or the timing diagrams 500. For example, a device, which may be an example of an AP or a STA as illustrated by and described with reference to FIGS. 1 through 4, 5A, and 5B, may use the traffic classification procedure 600 (e.g., an algorithm) to facilitate traffic classification.

For example, at 605, the device may perform a configuration (e.g., an initial configuration) for an observation window. At 610, the device may extract a data set (e.g., raw traffic data, such as a timestamp, a packet size, or a transmission direction) for the observation window. At 615, the device may use the data set to obtain an inference and a confidence (e.g., a confidence level) associated with the inference. At 620, the device may use the inference to determine whether the traffic class associated with the data set is known (e.g., to one or more machine learning models used at the device). If the traffic class is known the device may use the confidence level associated with the inference to determine whether the inference may be suitable accurate (e.g., trusted). For example, at 630 and if the inferences indicates that the traffic class is known, the device may determine whether the associated confidence level satisfies a threshold (4'). If the confidence level satisfies the threshold, the device may determine that the inference is suitable accurate. In some examples, based on determining that the inference is suitable accurate the device may determine to perform one or more operations based on the inference (e.g., based on the predicted traffic type or application name). In some other examples, the device may determine that the traffic class is unknown. For example, at 625 and if the inference indicates that the traffic class is unknown, the device may determine whether a stop criteria (e.g., a processing time associated with processing the traffic) is satisfied. In some examples, at 627 and if the stop criteria is satisfied, the device may determine (e.g., predict) that the traffic class associated with the data set is unknown. At 626, if the stop criteria fails to satisfy the threshold, the device may adjust the observation window (e.g., slide the observation window, adjust a duration associated with the operation window, move the operation window to a previous duration or subsequent duration). In some examples, subsequent to adjusting the observation window at 626, the device may perform another iteration of the traffic classification procedure 600 (e.g., restart the traffic classification procedure 600). For example, the device may use the adjusted observation window to extract data at 610.

In some examples, at 640 and as part of obtaining the inference and the associated confidence (e.g., at 615), the device may extract a quantity (M) of samples from the data set obtained during the observation window. The device may obtain a prediction for each sample extracted at 640. For example, at 645-*a*, the device may obtain a 1st prediction for the 1st sample. Additionally, at 645-*b*, the device may obtain an Mth prediction for the Mth sample. In some examples, the device may use multiple steps to obtain the prediction for each sample of the quantity of samples. For example, the device may use an analysis (e.g., an initial analysis), an inference, and in some examples, supervised learning, to obtain the prediction for each sample. For example, at 655, the device may extract a set of features from the Mth sample. At 660, the device may use the set of features for the Mth sample to determine whether the Mth sample is valid.

In some examples, the device may determine that the Mth sample is invalid. In such examples, at 661, the device may determine that the Mth sample corresponds to background (e.g., noise). In some other examples, the device may determine that the Mth sample is valid. For example, at 665 and if the device determines that the Mth sample is valid, the device may determine whether the Mth sample corresponds to real-time traffic. For example, the device may use an analysis, such as an analysis as described with reference to FIG. 2, to determine whether the set of features extracted from the Mth sample corresponds to periodic or aperiodic traffic. In some examples, if the device determines that the set of features extracted from the Mth sample corresponds to periodic traffic, the device may also determine that the Mth sample corresponds to real-time traffic.

In some examples, the device may determine that the Mth sample corresponds to non-real-time traffic. In such an example, at 667, the device may determine that a traffic class associated with the Mth sample is unknown. In some other examples, the device may determine that the Mth sample corresponds to real-time traffic. In such an example, if the device determines that the Mth sample corresponds to real-time traffic, the device may input the Mth sample into multiple autoencoders in which each autoencoder may be used to detect a traffic class. That is, each autoencoder may be trained using a respective traffic class. For example, at 670-*a*, the device may input the Mth sample into a first autoencoder trained using a traffic class A, which may be associated with a first type of application. Additionally, the Mth sample may be input into one or more additional autoencoders, where at 670-*n*, the device may input the Mth sample into an nth autoencoder trained using a traffic class X, which may correspond to a second type of application. In such an example, if the first autoencoder predicts that the traffic class associated with the Mth sample corresponds to an unknown traffic class, the device may determine that the Mth sample is unassociated with the traffic class A. Additionally, or alternatively, if the first autoencoder predicts that the traffic class associated with the Mth sample corresponds to a known traffic class, the device may determine that the Mth sample is associated with the traffic class A. In some examples, the device may also use supervised learning to classify the traffic associated with the Mth sample. For example, at 671, the device may input the Mth sample into a multi-class classifier. The multi-class classifier may be an example of a multi-class classifier as described with reference to FIGS. 5A and 5B. For example, the multi-class classifier may output an application name associated with the Mth sample.

In some examples, at 675, the device may determine whether the predictions output using the autoencoders are consistent with the prediction output using the multi-class classifier. For example, the device may apply combining logic to determine a confidence level associated with the output of the autoencoders (e.g., the first autoencoder trained using traffic class A and the second autoencoder trained using traffic class X) or the output of the multi-class classifier, or both. For example, the device may combine the output of the autoencoders with the output of the multi-class classifier (e.g., supervised learning) to determine whether the respective outputs are consistent. That is, the combining logic may analyze the predictions output using the autoencoders (e.g., at 670-*a* through 670-*n*) and the prediction output using the multi-class classifier (e.g., at 671) and determines whether the predictions are consistent. For example, the traffic class A may be associated with a first type of application. In such an example, the autoencoder may predict that the traffic class is known. Additionally, the multi-class classifier may predict that the sample is associated with an application. In such an example, the combining logic may determine whether the application predicted using the multi-class classifier is of the first type of application. That is, the combining logic may determine that the prediction of the autoencoders is consistent with the prediction of the multi-class classifier if the application predicted using the multi-class classifier corresponds to the first type of application predicted using the autoencoders. Additionally, or alternatively, the combining logic may determine that the prediction of the autoencoders is inconsistent with the prediction of the multi-class classifier if the application predicted using the multi-class classifier corresponds to a second type of application different from the first type of application predicted using the autoencoders.

In some examples, the device may use the combining logic to determine whether the predictions of the autoencoders is consistent. For example, the combining logic may determine that the prediction of the autoencoders is inconsistent if more than one autoencoder predicts that the sample is associated with a known traffic class. For example, if the autoencoder trained using the traffic class A (e.g., XR traffic) and the autoencoder trained using the traffic class X (e.g., conferencing traffic) both predict that the traffic class associated with the sample is known, the combining logic may determine that the predictions are inconsistent. Additionally, or alternatively, the combining logic may determine that the predictions are inconsistent if the autoencoders or multi-class classifier (or both) output multiple (e.g., different) predictions for multiple samples extracted from the observation window. For instance, out of the quantity of samples, a first portion (e.g., 2 samples) of the samples may be detected as gaming applications, a second portion (e.g., 3 samples) of the samples may be detected as conferencing application, and a third portion (e.g., 4 samples) may be detected as XR applications. In such an example, the combining logic may determine that the predictions are inconsistent. In some examples, at 676 and if the combining logic determines that the predictions are inconsistent, the device may determine that the traffic class associated with the sample is unknown. Additionally, or alternatively, at 680 and if the combining logic determines that the predictions for the Mth sample are consistent, the device may obtain the Mth prediction for use in a subsequent step. For example, at 650, the device may use the predictions obtained for the samples (e.g., samples 1 through M) to determine a confidence level associated with the predictions for the data set obtained during the observation window. In some examples, the device may determine the confidence level in accordance with the following Equation 3:

$$\text{Confidence Level } (c) = \frac{\text{\# of preditctions in favor of traffic } c}{M} \quad (3)$$

in which c may correspond to an obtained prediction (e.g., a type of application or an application name) for the data set. In such an example, the device may determine to select a prediction for the data set in which the confidence level may be increased (e.g., maximized). That is, the device may determine to use a prediction associated with a relatively highest confidence level. For example, the device may obtain (e.g., determine to use) a prediction for the data set in accordance with the following Equation 4:

$$\text{Prediction} = \text{ArgMax}[\text{Confidence Level}(c)]. \quad (4)$$

In some examples, determining to use a prediction based on a respective confidence level may lead to increased performance at the device, among other possible benefits.

Figure 7:
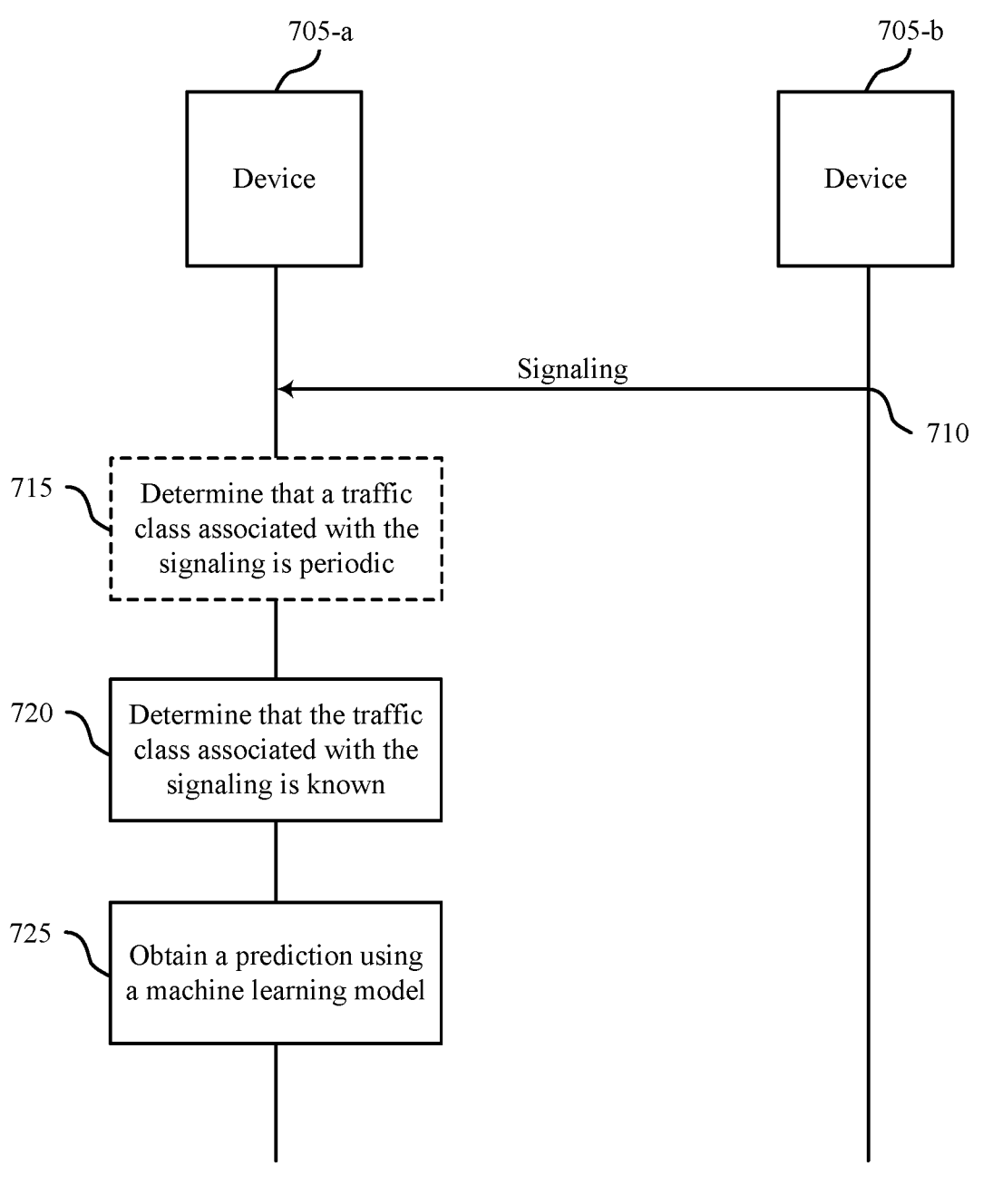

FIG. 7 illustrates an example of a process flow 700 that supports traffic identification using machine learning in accordance with one or more aspects of the present disclosure. The process flow 700 may implement or be implemented to realize or facilitate aspects of the wireless communications system 100, the wireless communications system 200, the data generation procedure 300, the inference procedure 400, the timing diagrams 500, or the traffic classification procedure 600. For example, the process flow 700 may include example operations associated a device 705-a and a device 705-b, which may be examples of an AP or a STA as illustrated by and described with reference to FIGS. 1 through 4, 5A, 5B, and 6. The operations performed by the devices 705 may support improvements to communications between the device 705, among other benefits. In the following description of the process flow 700, the operations between the devices 705 may occur in a different order than the example order shown. Additionally, or alternatively, the operations performed by devices 705 may be performed in different orders or at different times. Some operations may also be omitted. In the example of FIG. 7, the devices 705 may support a multi-step framework for determining whether a traffic class is known to a machine learning model.

At 710, the device 705-a may receive signaling from the device 705-b. In some examples, the signaling may be associated with a traffic class. For example, device 705-b may use the signaling to transmit data packets (e.g., traffic) to the device 705-a. In some examples, the traffic may be generated from an application used at the device 705-b (e.g., and the device 705-a). In such an example, the traffic class associated with the signaling may correspond to a type of application generating the traffic. The device 705-b may receive the signaling during an observation window, which may be an example of a window as described with reference to FIG. 3.

In some examples, at 715, the device 705-a may determine that the traffic class associated with the signaling corresponds to a periodic traffic class. For example, the device 705-a may perform an analysis, which may be an example of an analysis as described with reference to FIG. 2, to determine whether the traffic class associated with the signaling corresponds to periodic traffic class or aperiodic traffic class based on a set of features associated with the signaling. In the example of FIG. 7, the device may determine that the traffic class associated with the signaling corresponds to a periodic traffic class based on an energy metric associated with the set of features satisfying a threshold. In some examples, the threshold may be an example of a first threshold as described with reference to FIG. 3. For example, the device 705-a may select the threshold based on a difference between a first energy metric associated with the periodic traffic class and a second energy metric associated with the aperiodic traffic class.

At 720, the device 705-a may determine that the traffic class associated with the signaling is included in a set of known traffic classes based on the set of features associated with the signaling. For example, in response to determining that the traffic class is associated with the periodic traffic class (e.g., at 715), the device 705-a may use an autoencoder to perform an inference, which may be an example of an inference as described with reference to FIG. 2. In such an example, the device may use the autoencoder to obtain a reconstruction of the set of features. In such an example, the device may determine that the traffic class associated with the signaling is included in the set of known traffic classes based on a loss associated with the reconstruction satisfying a threshold. The loss may be an example of a reconstruction loss as described with reference to FIG. 4. For example, the reconstruction loss may correspond to a difference between the reconstruction of the set of features and the set of features.

At 725, the device 705-a may obtain a prediction of an application associated with the signaling using a machine learning model. For example, the device 705-a may use supervised learning, which may be an example of supervised learning as described with reference to FIG. 2. The machine learning model may be an example of a machine learning model as described with reference to FIG. 2. For example, the machine learning model may include a multi-class classifier and the prediction output using the multi-class classifier may be based on the set of features. In some examples, using the analysis and the inference to determine whether the traffic class is known to a machine learning model, and using the supervised learning obtain a prediction of the application associated with the traffic class, may lead to increased performance at the device 705-a, among other possible benefits.

FIG. 8 illustrates an example of a process flow 800 that supports traffic identification using machine learning in accordance with one or more aspects of the present disclosure. The process flow 800 may implement or be implemented to realize or facilitate aspects of the wireless communications system 100, the wireless communications system 200, the data generation procedure 300, the inference procedure 400, the timing diagrams 500, the traffic classification procedure 600, or the process flow 700. For example, the process flow 800 may include example operations associated a device 805-a and a device 805-b, which may be examples of an AP or a STA as illustrated by and described with reference to FIGS. 1 through 4, 5A, 5B, 6, and 7. The operations performed by the devices 805 may support improvements to communications between the device 805, among other benefits. In the following description of the process flow 800, the operations between the devices 805 may occur in a different order than the example order shown. Additionally, or alternatively, the operations performed by devices 805 may be performed in different orders or at different times. Some operations may also be omitted. In the example of FIG. 7, the devices 705 may support a multi-step framework for determining whether a traffic class is known to a machine learning model.

At 810, the device 805-a may transmit signaling to the device 805-b. In some examples, the signaling may be associated with a traffic class. For example, device 805-a may use the signaling to transmit data packets (e.g., traffic) to the device 805-b. In some examples, the traffic may be generated from an application used at the device 805-b (e.g., and the device 805-a). In such an example, the traffic class associated with the signaling may correspond to a type of application generating the traffic.

In some examples, at 815, the device 805-a may receive a request for machine learning model information from the device 805-b. The request may be an example of a request as described with reference to FIG. 2. For example, the device 805-b may transmit the request based on a performance of anther machine learning model used at the device 805-b for classifying traffic.

In some examples, at 820, the device may transmit machine learning model feedback to the device 805-b. In some examples, the machine learning model feedback may be associated with the performance of the other machine learning model used at the device 805-*b* for classifying traffic. For example, the device 805-*a* may transmit the machine learning model feedback to the device 805-*b* based on determining that a first traffic class identified at the device 805-*b* (e.g., using the other machine learning model) is different from a second traffic class associated with the signaling transmitted to the device 805-*b* (e.g., at 810).

At 825, the device 805-*a* may transmit the machine learning model information to the device 805-*b*. The machine learning model information may be an example of machine learning model information as described with reference to FIG. 2. For example, the machine learning model information may include a quantity of layers included in the machine learning model, a respective quantity of neurons associated with each layer included in the machine learning model, and a set of multiple weights to be used for connecting each neuron included in the machine learning model.

In some examples, the machine learning model is to be used at the device 805-*b* for identifying the traffic class associated with the signaling transmitted at 810. For example, the device 805-*a* may transmit the machine learning model information to the device 805-*b* in response to the request for machine learning model information received at the device 805-*a* at 815. Additionally, or alternatively, the device 805-*a* may transmit the machine learning model information to the device 805-*b* in response to transmitting the machine learning model feedback at 820. In some examples, transmitting the machine learning model information to the device 805-*b* may reduce latency and increase a reliability of communications between the devices 805, among other possible benefits.

Figure 9:
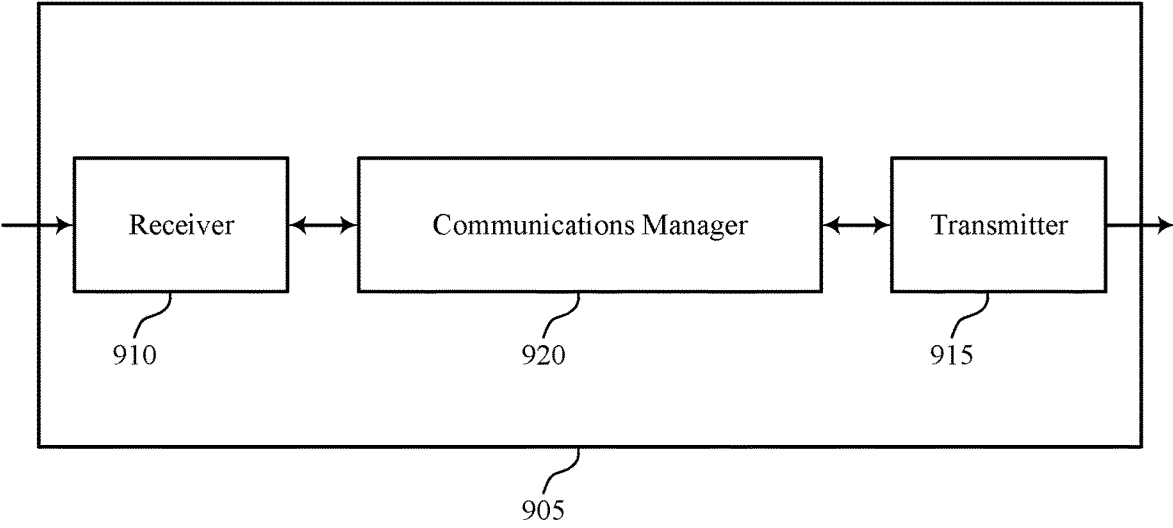
FIGS. 9 and 10 illustrate block diagrams of devices that support traffic identification using machine learning in accordance with one or more aspects of the present disclosure.

FIG. 9 illustrates a block diagram 900 of a device 905 that supports traffic identification using machine learning in accordance with one or more aspects of the present disclosure. The device 905 may be an example of aspects of an AP or an STA as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to traffic identification using machine learning). Information may be passed on to other components of the device 905. The receiver 910 may utilize a single antenna or a set of multiple antennas.

The transmitter 915 may provide a means for transmitting signals generated by other components of the device 905. The transmitter 915 may utilize a single antenna or a set of multiple antennas.

The communications manager 920, the receiver 910, the transmitter 915, or various combinations thereof or various components thereof may be examples of means for performing various aspects of traffic identification using machine learning as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first device (e.g., the device 905) in accordance with examples as disclosed herein. For example, the communications manager 920 may be configured as or otherwise support a means for receiving signaling from a second device (e.g., another device 905), where the signaling is associated with a traffic class. The communications manager 920 may be configured as or otherwise support a means for determining that the traffic class associated with the signaling is included in a set of known traffic classes based on a set of features associated with the signaling. The communications manager 920 may be configured as or otherwise support a means for obtaining a prediction of an application associated with the signaling using a machine learning model, where the prediction is based on the set of features.

Additionally, or alternatively, the communications manager 920 may support wireless communication at a first device (e.g., the device 905) in accordance with examples as disclosed herein. For example, the communications manager 920 may be configured as or otherwise support a means for transmitting signaling to a second device (e.g., another device 905), where the signaling is associated with a traffic class. The communications manager 920 may be configured as or otherwise support a means for transmitting a first message indicating information associated with a machine learning model, where the machine learning model is to be used at the second device for identifying the traffic class.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
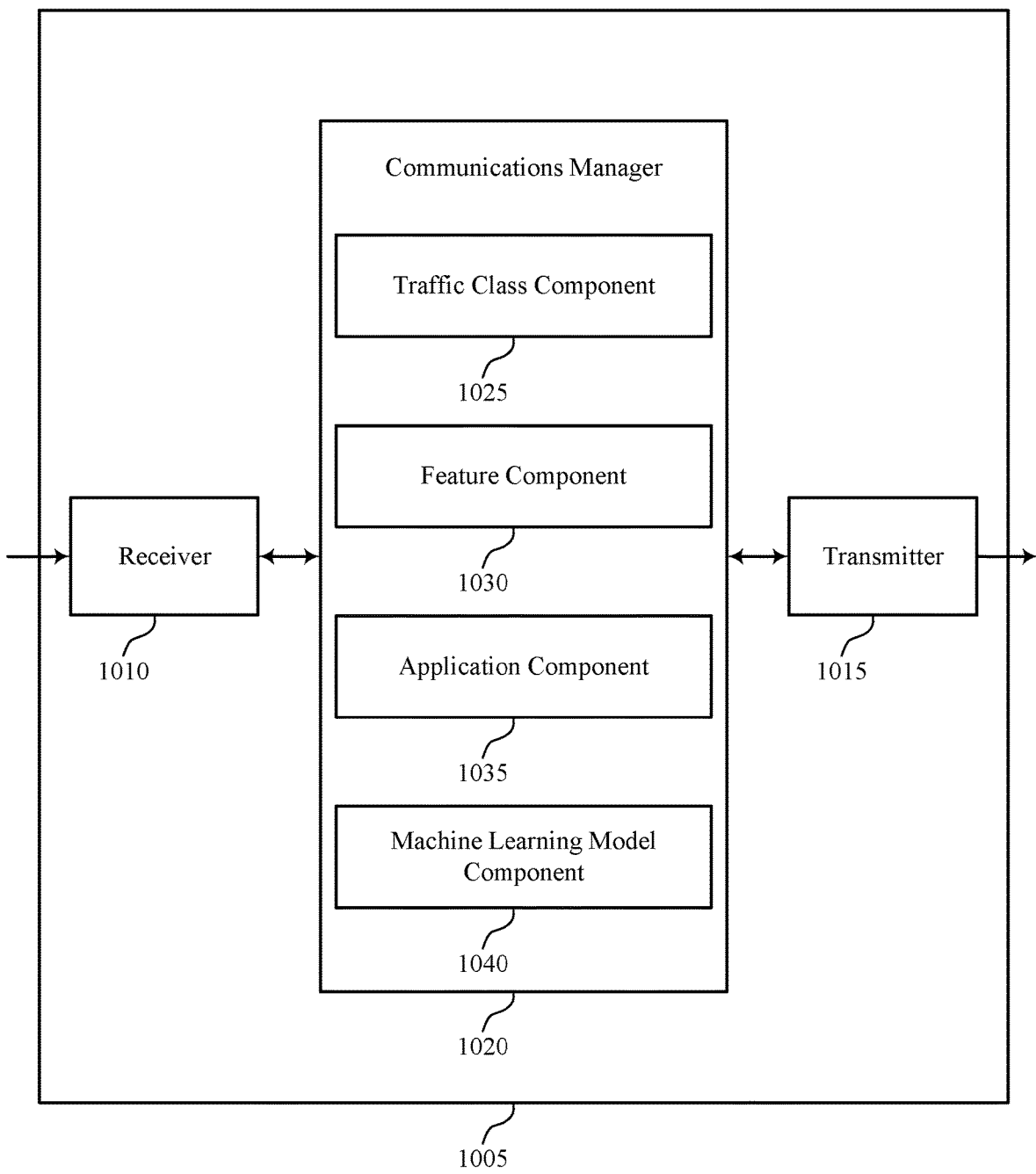

FIG. 10 illustrates a block diagram 1000 of a device 1005 that supports traffic identification using machine learning in accordance with one or more aspects of the present disclosure. The device 1005 may be an example of aspects of a device 905, an AP 102, or an STA 104 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to traffic identification using machine learning). Information may be passed on to other components of the device 1005. The receiver 1010 may utilize a single antenna or a set of multiple antennas.

The transmitter 1015 may provide a means for transmitting signals generated by other components of the device 1005. The transmitter 1015 may utilize a single antenna or a set of multiple antennas.

The device 1005, or various components thereof, may be an example of means for performing various aspects of traffic identification using machine learning as described herein. For example, the communications manager 1020 may include a traffic class component 1025, a feature component 1030, an application component 1035, a machine learning model component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first device (e.g., the device 1005) in accordance with examples as disclosed herein. The traffic class component 1025 may be configured as or otherwise support a means for receiving signaling from a second device (e.g., the device 1005), where the signaling is associated with a traffic class. The feature component 1030 may be configured as or otherwise support a means for determining that the traffic class associated with the signaling is included in a set of known traffic classes based on a set of features associated with the signaling. The application component 1035 may be configured as or otherwise support a means for obtaining a prediction of an application associated with the signaling using a machine learning model, where the prediction is based on the set of features.

Additionally, or alternatively, the communications manager 1020 may support wireless communication at a first device (e.g., the device 1005) in accordance with examples as disclosed herein. The traffic class component 1025 may be configured as or otherwise support a means for transmitting signaling to a second device (e.g., another device 1005), where the signaling is associated with a traffic class. The machine learning model component 1040 may be configured as or otherwise support a means for transmitting a first message indicating information associated with a machine learning model, where the machine learning model is to be used at the second device for identifying the traffic class.

Figure 11:
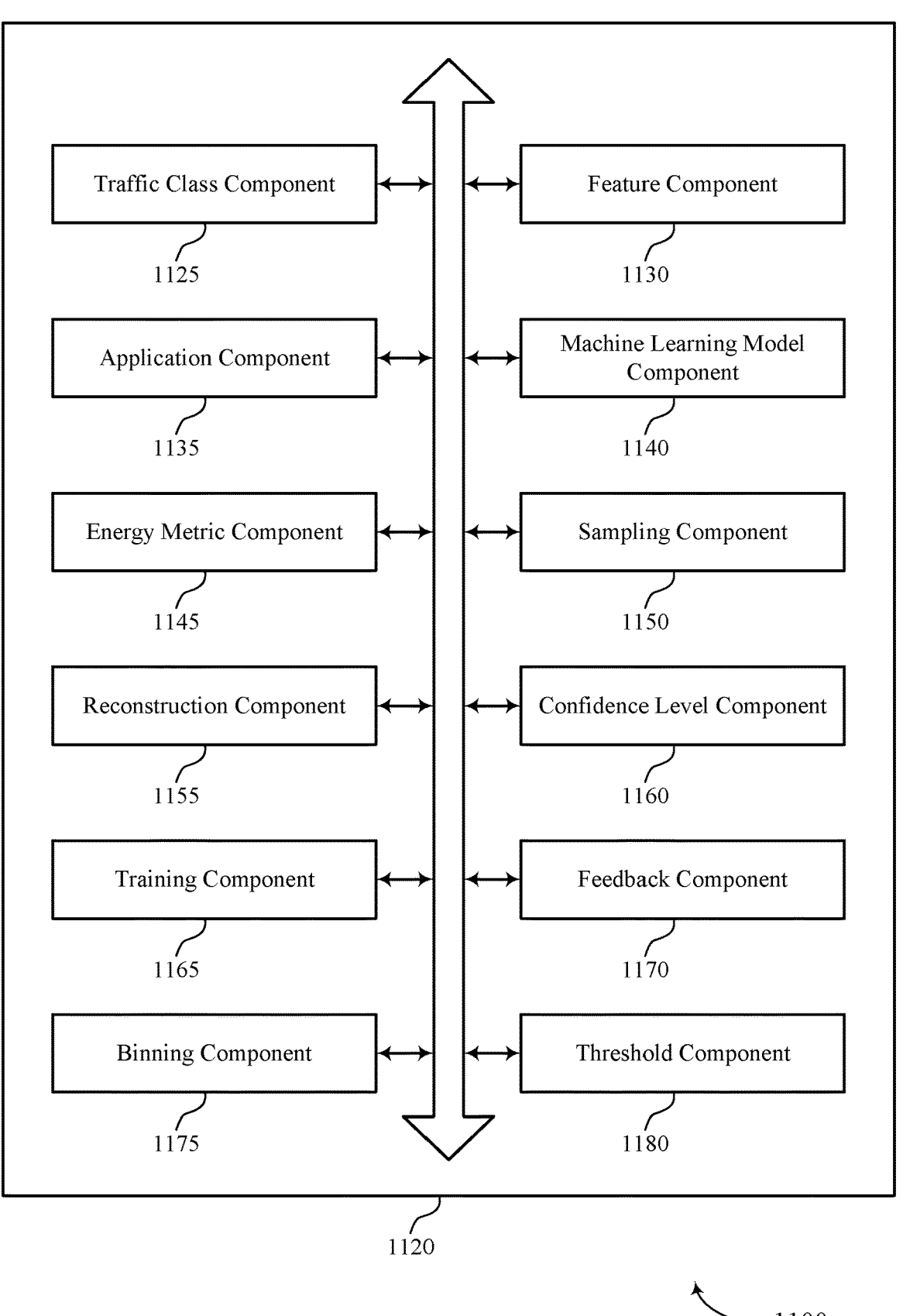
FIG. 11 illustrates a block diagram of a communications manager that supports traffic identification using machine learning in accordance with one or more aspects of the present disclosure.

FIG. 11 illustrates a block diagram 1100 of a communications manager 1120 that supports traffic identification using machine learning in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of traffic identification using machine learning as described herein. For example, the communications manager 1120 may include a traffic class component 1125, a feature component 1130, an application component 1135, a machine learning model component 1140, an energy metric component 1145, a sampling component 1150, a reconstruction component 1155, a confidence level component 1160, a training component 1165, a feedback component 1170, a binning component 1175, a threshold component 1180, or any combination thereof. Each of these components may communicate, directly or indirectly, with one another (e.g., via one or more buses).

The communications manager 1120 may support wireless communication at a first device in accordance with examples as disclosed herein. The traffic class component 1125 may be configured as or otherwise support a means for receiving signaling from a second device, where the signaling is associated with a traffic class. The feature component 1130 may be configured as or otherwise support a means for determining that the traffic class associated with the signaling is included in a set of known traffic classes based on a set of features associated with the signaling. The application component 1135 may be configured as or otherwise support a means for obtaining a prediction of an application associated with the signaling using a machine learning model, where the prediction is based on the set of features.

In some examples, the energy metric component 1145 may be configured as or otherwise support a means for determining that the traffic class associated with the signaling corresponds to a periodic traffic class based on an energy metric associated with the set of features satisfying a threshold, where determining that the traffic class is included in the set of known traffic classes is based on the traffic class corresponding to the periodic traffic class.

In some examples, the energy metric component 1145 may be configured as or otherwise support a means for determining a first energy metric associated with a first traffic class and a second energy metric associated with a second traffic class. In some examples, the energy metric component 1145 may be configured as or otherwise support a means for selecting the threshold based on a difference between the first energy metric and the second energy metric.

In some examples, the sampling component 1150 may be configured as or otherwise support a means for obtaining an information set based on sampling the signaling in a time domain and in accordance with a sampling rate, where the sampling rate is based on a rate at which the signaling is received at the first device. In some examples, the feature component 1130 may be configured as or otherwise support a means for identifying the set of features based on translating the information set from the time domain to a frequency domain.

In some examples, the binning component 1175 may be configured as or otherwise support a means for binning the information set in the frequency domain, where identifying the set of features is further based on the binning. In some examples, the feature component 1130 may be configured as or otherwise support a means for identifying a set of multiple sets of features associated with the signaling, where determining that the traffic class associated with the signaling is included in the set of known traffic classes is based on the set of multiple sets of features.

In some examples, each set of features of the set of multiple sets of features corresponds to a respective internet protocol flow. In some examples, each set of features of the set of multiple sets of features corresponds to a respective time interval during which the signaling is received.

In some examples, the feature component 1130 may be configured as or otherwise support a means for combining at least two sets of features of the set of multiple sets of features, where determining that the traffic class associated with the signaling is included in the set of known traffic classes is based on a combination of the at least two sets of features.

In some examples, the reconstruction component 1155 may be configured as or otherwise support a means for obtaining a reconstruction of the set of features using an autoencoder, where determining that the traffic class associated with the signaling is included in the set of known traffic classes is based on a loss associated with the reconstruction satisfying a threshold. In some examples, the loss includes a reconstruction loss. In some examples, the reconstruction loss corresponds to a difference between the reconstruction of the set of features and the set of features. In some examples, the autoencoder is one or a set of multiple autoencoders used at the first device. In some examples, each autoencoder of the set of multiple autoencoders is associated with a respective traffic class of the set of known traffic classes.

In some examples, the training component 1165 may be configured as or otherwise support a means for training the autoencoder using a set of multiple sets of features, where each set of features of the set of multiple sets of features is associated with a respective traffic class of the set of known traffic classes. In some examples, the threshold component 1180 may be configured as or otherwise support a means for selecting the threshold based on distribution of loss across the set of multiple sets of features.

In some examples, the traffic class component 1125 may be configured as or otherwise support a means for identifying a first traffic class based on determining that the traffic class associated with the signaling is included in the set of known traffic classes. In some examples, the traffic class component 1125 may be configured as or otherwise support a means for determining that a second traffic class associated with the application is consistent with the first traffic class. In some examples, the confidence level component 1160 may be configured as or otherwise support a means for obtaining a confidence level associated with the prediction of the application based on determining that the second traffic class is consistent with the first traffic class.

In some examples, the confidence level component 1160 may be configured as or otherwise support a means for performing one or more operations in accordance with the traffic class based on the confidence level associated with the prediction of the application. In some examples, the first device includes an AP. In some examples, performing the one or more operations includes performing QoS provisioning, scheduling communications with the second device, performing load balancing, determining a mapping between one or more traffic classes and one or more communication links, performing admission control, or predicting movement of a user associated with the second device, or any combination thereof.

In some examples, the first device includes a client. In some examples, performing the one or more operations includes identifying one or more communication links to use while operating in an active mode, identifying one or more power save patterns, populating a QoS characteristics element, identifying a value of an rTWT parameter, identifying a channel access mechanism, predicting movement of a user associated with the first device, or any combination thereof.

In some examples, the training component 1165 may be configured as or otherwise support a means for training the machine learning model using a set of multiple information sets, where each information set of the set of multiple information sets is associated with a respective application, where the prediction of the application is based on training the machine learning model.

In some examples, the set of features includes a quantity of packets, a statistic based on the quantity of packets, or a statistic based on an inter-arrival time. In some examples, the set of features are based on a transmission direction associated with the signaling. In some examples, the machine learning model includes a multi-class classifier. In some examples, the traffic class corresponds to a type of application. In some examples, the type of application includes an XR application, a gaming application, or a video conferencing application.

Additionally, or alternatively, the communications manager 1120 may support wireless communication at a first device in accordance with examples as disclosed herein. In some examples, the traffic class component 1125 may be configured as or otherwise support a means for transmitting signaling to a second device, where the signaling is associated with a traffic class. The machine learning model component 1140 may be configured as or otherwise support a means for transmitting a first message indicating information associated with a machine learning model, where the machine learning model is to be used at the second device for identifying the traffic class.

In some examples, the machine learning model component 1140 may be configured as or otherwise support a means for receiving, from the second device, a second message requesting the information associated with the machine learning model, where transmitting the first message is based on receiving the second message.

In some examples, the feedback component 1170 may be configured as or otherwise support a means for transmitting, to the second device, a second message indicating feedback associated with a performance of a first machine learning model used at the second device for classifying traffic, where transmitting the first message is based on the feedback. In some examples, transmitting the second message is based on determining that a first traffic class identified at the second device is different from a second traffic class associated with the signaling transmitted to the second device.

In some examples, the feedback component 1170 may be configured as or otherwise support a means for receiving, from the second device, a second message indicating feedback associated with a performance of a first machine learning model used at the second device for classifying traffic, where transmitting the first message indicating the information associated with the machine learning model is based on the feedback.

In some examples, the training component 1165 may be configured as or otherwise support a means for training the machine learning model using a set of multiple information sets, where each information set of the set of multiple information sets is associated with a respective traffic class of a set of known traffic classes, and where the machine learning model is to be used for identifying, at the second device, whether the traffic class associated with the signaling transmitted from the first device is included in the set of known traffic classes.

In some examples, the training component 1165 may be configured as or otherwise support a means for training the machine learning model using a set of multiple information sets, where each information set of the set of multiple information sets is associated with a respective application of a set of multiple applications, and where the machine learning model is to be used for identifying, at the second device, an application associated with the signaling transmitted from the first device.

In some examples, the training component 1165 may be configured as or otherwise support a means for training the machine learning model using a set of multiple information sets, where each information set of the set of multiple information sets is associated with a respective internet protocol flow of a set of multiple internet protocol flows, and where the machine learning model is to be used for identifying, at the second device, an internet protocol flow associated with the signaling transmitted from the first device.

In some examples, the training component 1165 may be configured as or otherwise support a means for training the machine learning model using a set of multiple information sets, where each information set of the set of multiple information sets is associated with a respective access category of a set of multiple access categories, and where the machine learning model is to be used for identifying, at the second device, an access category associated with the signaling transmitted from the first device.

In some examples, the training component 1165 may be configured as or otherwise support a means for training the machine learning model using a set of multiple information sets, where each information set of the set of multiple information sets is associated with a respective traffic identifier of a set of multiple traffic identifiers, and where the machine learning model is to be used, at the second device, for identifying a traffic identifier associated with the signaling transmitted from the first device.

In some examples, the training component 1165 may be configured as or otherwise support a means for training the machine learning model using a set of multiple information sets, where each information set of the set of multiple information sets is associated with a respective user priority of a set of multiple user priorities, and where the machine learning model is to be used for identifying, at the second device, a user priority associated with the signaling transmitted from the first device.

In some examples, the training component 1165 may be configured as or otherwise support a means for training the machine learning model using a set of multiple information sets, where each information set of the set of multiple information sets is associated with a respective periodicity, and where the machine learning model is to be used for identifying, at the second device, whether the signaling transmitted from the first device is periodic or aperiodic.

In some examples, the information includes a first parameter corresponding to a frequency component and a second parameter corresponding to an energy threshold. In some examples, the machine learning model includes a random forests model or a deep neural network-based model.

In some examples, the information includes a quantity of layers included in the machine learning model, a respective quantity of neurons associated with each layer included in the machine learning model, and a set of multiple weights to be used for connecting each neuron included in the machine learning model. In some examples, the traffic class corresponds to a type of application. In some examples, the type of application includes an XR application, a gaming application, or a video conferencing application. In some examples, the first device and the second device include stations.

Figure 12:
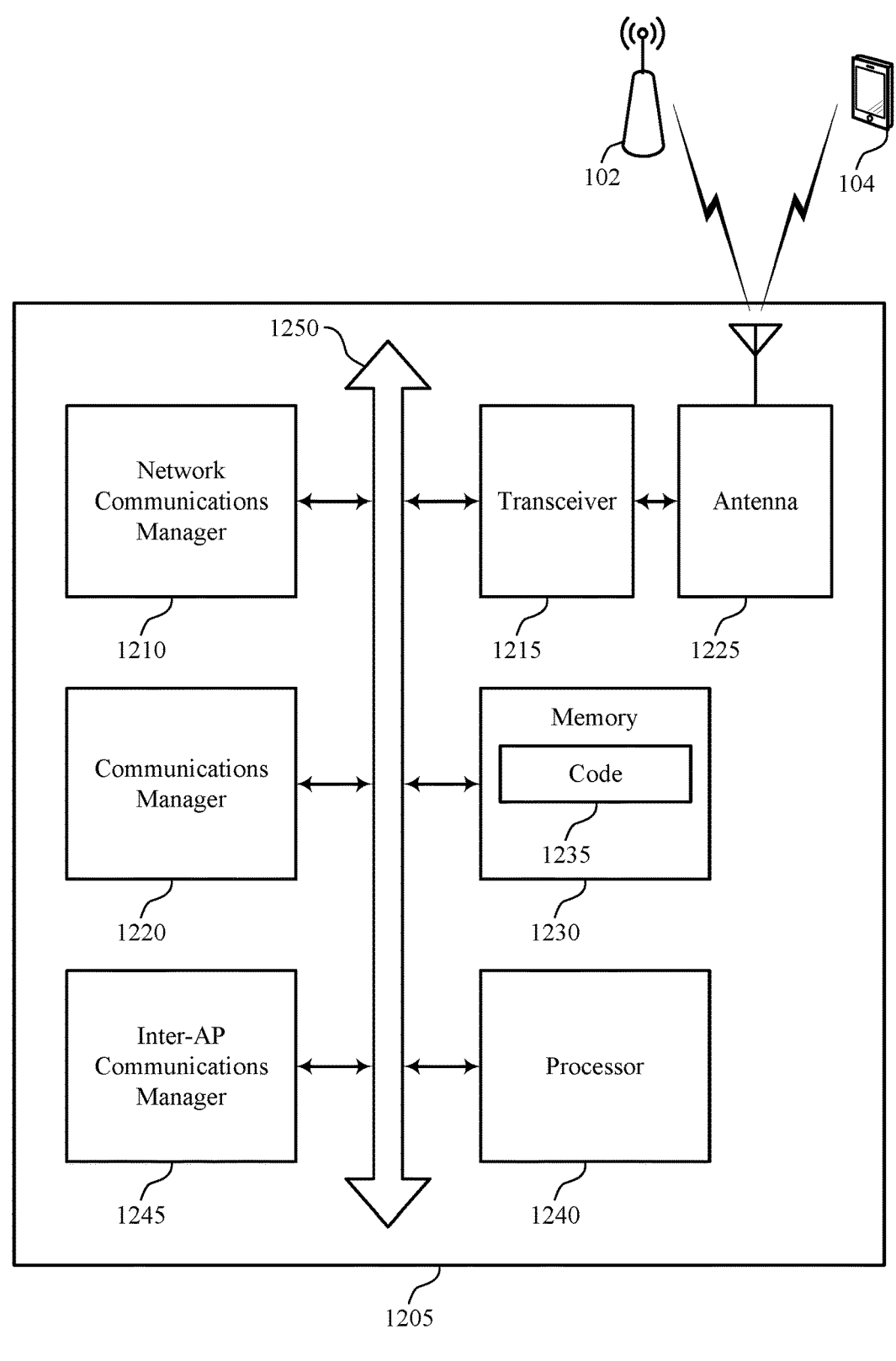
FIG. 12 illustrates a diagram of a system including an AP that supports traffic identification using machine learning in accordance with one or more aspects of the present disclosure.

FIG. 12 illustrates a diagram of a system 1200 including a device 1205 that supports traffic identification using machine learning in accordance with one or more aspects of the present disclosure. The device 1205 may be an example of or or include the components of a device 905, a device 1005, or an AP as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network (e.g., via one or more wired backhaul links). For example, the network communications manager 1210 may manage the transfer of data communications for client devices, such as one or more STAs 104.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting traffic identification using machine learning). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other APs 102, and may include a controller or scheduler for controlling communications with STAs 104 in cooperation with other APs 102. For example, the inter-station communications manager 1245 may coordinate scheduling for transmissions to APs 102 for various interference mitigation techniques such as beamforming or joint transmission. In some examples, the inter-station communications manager 1245 may provide an X2 interface within an LTE/LTE-A wireless communication network technology to provide communication between APs 102.

The communications manager 1220 may support wireless communication at a first device (e.g., the device 1205) in accordance with examples as disclosed herein. For example, the communications manager 1220 may be configured as or otherwise support a means for receiving signaling from a second device (e.g., another device 1205), where the signaling is associated with a traffic class. The communications manager 1220 may be configured as or otherwise support a means for determining that the traffic class associated with the signaling is included in a set of known traffic classes based on a set of features associated with the signaling. The communications manager 1220 may be configured as or otherwise support a means for obtaining a prediction of an application associated with the signaling using a machine learning model, where the prediction is based on the set of features.

Additionally, or alternatively, the communications manager 1220 may support wireless communication at a first device (e.g., the device 1205) in accordance with examples as disclosed herein. For example, the communications manager 1220 may be configured as or otherwise support a means for transmitting signaling to a second device (e.g., another device 1205), where the signaling is associated with a traffic class. The communications manager 1220 may be configured as or otherwise support a means for transmitting a first message indicating information associated with a machine learning model, where the machine learning model is to be used at the second device for identifying the traffic class.

By including or configuring the communications manager 1220 in accordance with examples as described herein, the device 1205 may support techniques for improved communication reliability and reduced latency.

Figure 13:
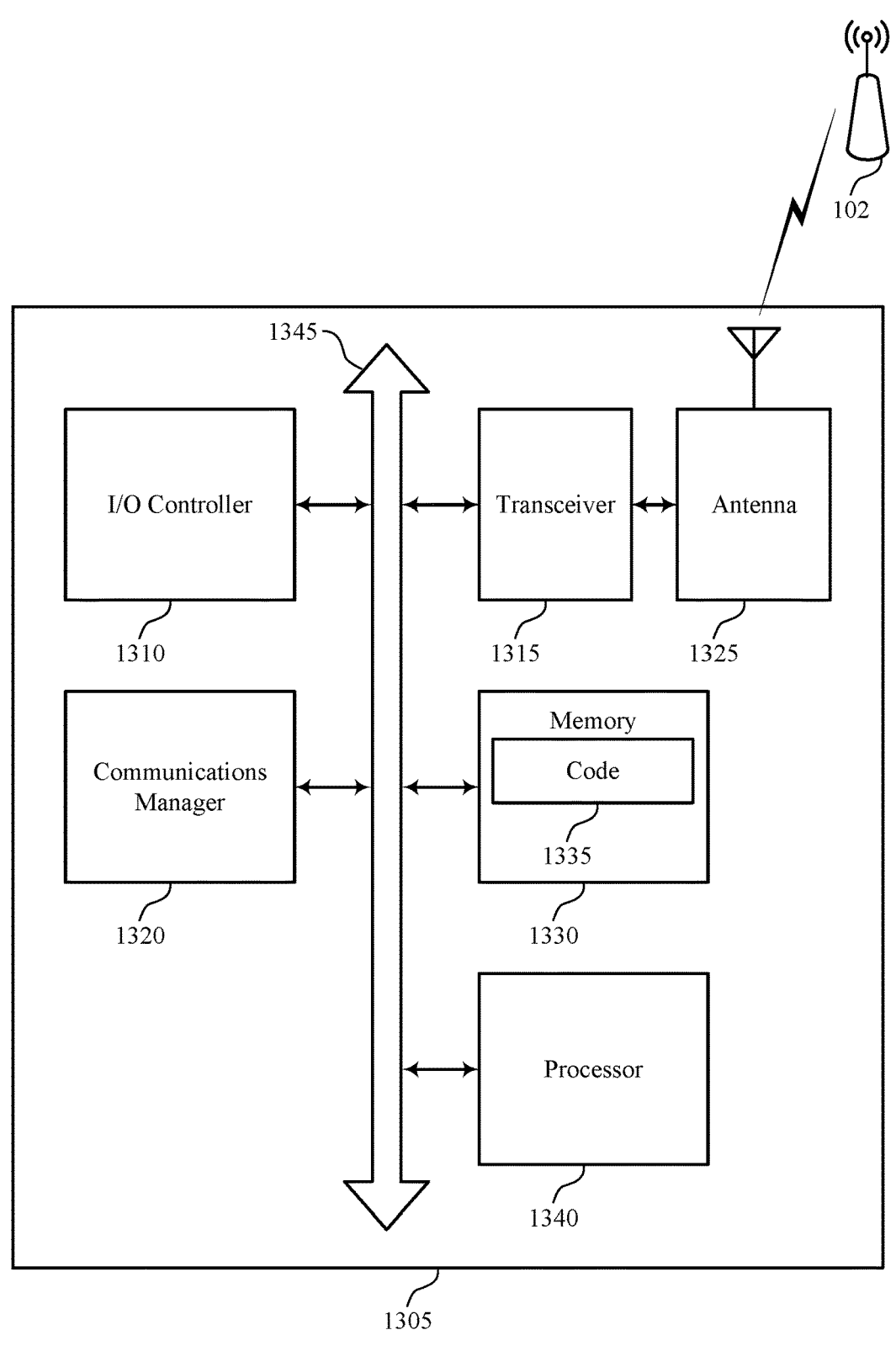
FIG. 13 illustrates a diagram of a system including an STA that supports traffic identification using machine learning in accordance with one or more aspects of the present disclosure.

FIG. 13 illustrates a diagram of a system 1300 including a device 1305 that supports traffic identification using machine learning in accordance with one or more aspects of the present disclosure. The device 1305 may be an example of or include the components of a device 905, a device 1005, or an STA as described herein. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. In some other cases, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets and provide the modulated packets to one or more antennas 1325 for transmission, and to demodulate packets received from the one or more antennas 1325. The transceiver 1315, or the transceiver 1315 and one or more antennas 1325, may be an example of a transmitter 915, a transmitter 1015, a receiver 910, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting traffic identification using machine learning). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a first device (e.g., the device 1305) in accordance with examples as disclosed herein. For example, the communications manager 1320 may be configured as or otherwise support a means for receiving signaling from a second device (e.g., another device 1305), where the signaling is associated with a traffic class. The communications manager 1320 may be configured as or otherwise support a means for determining that the traffic class associated with the signaling is included in a set of known traffic classes based on a set of features associated with the signaling. The communications manager 1320 may be configured as or otherwise support a means for obtaining a prediction of an application associated with the signaling using a machine learning model, where the prediction is based on the set of features.

Additionally, or alternatively, the communications manager 1320 may support wireless communication at a first device (e.g., the device 1305) in accordance with examples as disclosed herein. For example, the communications manager 1320 may be configured as or otherwise support a means for transmitting signaling to a second device (e.g., another device 1305), where the signaling is associated with a traffic class. The communications manager 1320 may be configured as or otherwise support a means for transmitting a first message indicating information associated with a machine learning model, where the machine learning model is to be used at the second device for identifying the traffic class.

By including or configuring the communications manager 1320 in accordance with examples as described herein, the device 1305 may support techniques for improved communication reliability and reduced latency.

FIG. 14 illustrates a flowchart illustrating a method 1400 that supports traffic identification using machine learning in accordance with one or more aspects of the present disclosure. The operations of the method 1400 may be implemented by an AP or an STA or its components as described herein. For example, the operations of the method 1400 may be performed by an AP or an STA as described with reference to FIGS. 1 through 13. In some examples, an AP or an STA may execute a set of instructions to control the functional elements of the AP or the STA to perform the described functions. Additionally, or alternatively, the AP or the STA may perform aspects of the described functions using special-purpose hardware.

At 1405, the method may include receiving signaling from a second device, where the signaling is associated with a traffic class. The operations of 1405 may be performed in accordance with examples as disclosed herein. In some examples, aspects of the operations of 1405 may be performed by a traffic class component 1125 as described with reference to FIG. 11.

At 1410, the method may include determining that the traffic class associated with the signaling is included in a set of known traffic classes based on a set of features associated with the signaling. The operations of 1410 may be performed in accordance with examples as disclosed herein. In some examples, aspects of the operations of 1410 may be performed by a feature component 1130 as described with reference to FIG. 11.

At 1415, the method may include obtaining a prediction of an application associated with the signaling using a machine learning model, where the prediction is based on the set of features. The operations of 1415 may be performed in accordance with examples as disclosed herein. In some examples, aspects of the operations of 1415 may be performed by an application component 1135 as described with reference to FIG. 11.

Figure 15:
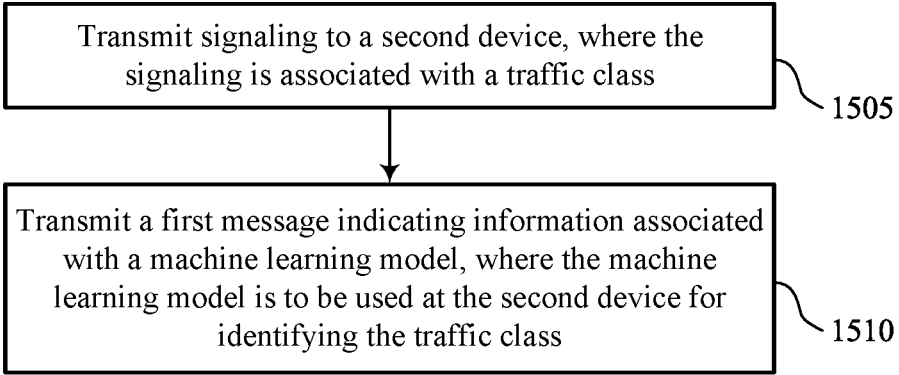

FIG. 15 illustrates a flowchart illustrating a method 1500 that supports traffic identification using machine learning in accordance with one or more aspects of the present disclosure. The operations of the method 1500 may be implemented by an AP or an STA or its components as described herein. For example, the operations of the method 1500 may be performed by an AP or an STA as described with reference to FIGS. 1 through 13. In some examples, an AP or an STA may execute a set of instructions to control the functional elements of the AP or the STA to perform the described functions. Additionally, or alternatively, the AP or the STA may perform aspects of the described functions using special-purpose hardware.

At 1505, the method may include transmitting signaling to a second device, where the signaling is associated with a traffic class. The operations of 1505 may be performed in accordance with examples as disclosed herein. In some examples, aspects of the operations of 1505 may be performed by a traffic class component 1125 as described with reference to FIG. 11.

At 1510, the method may include transmitting a first message indicating information associated with a machine learning model, where the machine learning model is to be used at the second device for identifying the traffic class. The operations of 1510 may be performed in accordance with examples as disclosed herein. In some examples, aspects of the operations of 1510 may be performed by a machine learning model component 1140 as described with reference to FIG. 11.

The following provides an overview of aspects of the present disclosure:

Aspect 1: A method for wireless communication at a first device, comprising: receiving signaling from a second device, wherein the signaling is associated with a traffic class; determining that the traffic class associated with the signaling is included in a set of known traffic classes based at least in part on a set of features associated with the signaling; and obtaining a prediction of an application associated with the signaling using a machine learning model, wherein the prediction is based at least in part on the set of features.

Aspect 2: The method of aspect 1, further comprising: determining that the traffic class associated with the signaling corresponds to a periodic traffic class based at least in part on an energy metric associated with the set of features satisfying a threshold, wherein determining that the traffic class is included in the set of known traffic classes is based at least in part on the traffic class corresponding to the periodic traffic class.

Aspect 3: The method of aspect 2, further comprising: determining a first energy metric associated with a first traffic class and a second energy metric associated with a second traffic class; and selecting the threshold based at least in part on a difference between the first energy metric and the second energy metric.

Aspect 4: The method of any of aspects 1 through 3, further comprising: obtaining an information set based at least in part on sampling the signaling in a time domain and in accordance with a sampling rate, wherein the sampling rate is based at least in part on a rate at which the signaling is received at the first device; and identifying the set of features based at least in part on translating the information set from the time domain to a frequency domain.

Aspect 5: The method of aspect 4, further comprising: binning the information set in the frequency domain, wherein identifying the set of features is further based at least in part on the binning.

Aspect 6: The method of any of aspects 1 through 5, further comprising: identifying a plurality of sets of features associated with the signaling, wherein determining that the traffic class associated with the signaling is included in the set of known traffic classes is based at least in part on the plurality of sets of features.

Aspect 7: The method of aspect 6, wherein each set of features of the plurality of sets of features corresponds to a respective internet protocol flow.

Aspect 8: The method of aspect 6, wherein each set of features of the plurality of sets of features corresponds to a respective time interval during which the signaling is received.

Aspect 9: The method of aspect 8, further comprising: combining at least two sets of features of the plurality of sets of features, wherein determining that the traffic class associated with the signaling is included in the set of known traffic classes is based at least in part on a combination of the at least two sets of features.

Aspect 10: The method of any of aspects 1 through 9, further comprising: obtaining a reconstruction of the set of features using an autoencoder, wherein determining that the traffic class associated with the signaling is included in the set of known traffic classes is based at least in part on a loss associated with the reconstruction satisfying a threshold.

Aspect 11: The method of aspect 10, wherein the loss comprises a reconstruction loss, and the reconstruction loss corresponds to a difference between the reconstruction of the set of features and the set of features.

Aspect 12: The method of any of aspects 10 through 11, wherein the autoencoder is one or a plurality of autoencoders used at the first device, and each autoencoder of the plurality of autoencoders is associated with a respective traffic class of the set of known traffic classes.

Aspect 13: The method of any of aspects 10 through 12, further comprising: training the autoencoder using a plurality of sets of features, wherein each set of features of the plurality of sets of features is associated with a respective traffic class of the set of known traffic classes, and selecting the threshold based at least in part on distribution of loss across the plurality of sets of features.

Aspect 14: The method of any of aspects 1 through 13, further comprising: identifying a first traffic class based at least in part on determining that the traffic class associated with the signaling is included in the set of known traffic classes; determining that a second traffic class associated with the application is consistent with the first traffic class; and obtaining a confidence level associated with the prediction of the application based at least in part on determining that the second traffic class is consistent with the first traffic class.

Aspect 15: The method of aspect 14, further comprising: performing one or more operations in accordance with the traffic class based at least in part on the confidence level associated with the prediction of the application.

Aspect 16: The method of aspect 15, wherein the first device comprises an AP, and performing the one or more operations comprises performing QoS provisioning, scheduling communications with the second device, performing load balancing, determining a mapping between one or more traffic classes and one or more communication links, performing admission control, or predicting movement of a user associated with the second device, or any combination thereof.

Aspect 17: The method of aspect 15, wherein the first device comprises a client, and performing the one or more operations comprises identifying one or more communica-tion links to use while operating in an active mode, identi-fying one or more power save patterns, populating a QoS characteristics element, identifying a value of a restricted target wake time parameter, identifying a channel access mechanism, predicting movement of a user associated with the first device, or any combination thereof.

Aspect 18: The method of any of aspects 1 through 17, further comprising: training the machine learning model using a plurality of information sets, wherein each informa-tion set of the plurality of information sets is associated with a respective application, wherein the prediction of the appli-cation is based at least in part on training the machine learning model.

Aspect 19: The method of any of aspects 1 through 18, wherein the set of features comprises a quantity of packets, a statistic based on the quantity of packets, or a statistic based on an inter-arrival time.

Aspect 20: The method of any of aspects 1 through 19, wherein the set of features are based at least in part on a transmission direction associated with the signaling.

Aspect 21: The method of any of aspects 1 through 20, wherein the machine learning model comprises a multi-class classifier.

Aspect 22: The method of any of aspects 1 through 21, wherein the traffic class corresponds to a type of application, and the type of application comprises an XR application, a gaming application, or a video conferencing application.

Aspect 23: A method for wireless communication at a first device, comprising: transmitting signaling to a second device, wherein the signaling is associated with a traffic class; and transmitting a first message indicating information associated with a machine learning model, wherein the machine learning model is to be used at the second device for identifying the traffic class.

Aspect 24: The method of aspect 23, further comprising: receiving, from the second device, a second message requesting the information associated with the machine learning model, wherein transmitting the first message is based at least in part on receiving the second message.

Aspect 25: The method of aspect 23, further comprising: transmitting, to the second device, a second message indi-cating feedback associated with a performance of a first machine learning model used at the second device for classifying traffic, wherein transmitting the first message is based at least in part on the feedback.

Aspect 26: The method of aspect 25, wherein transmitting the second message is based at least in part on determining that a first traffic class identified at the second device is different from a second traffic class associated with the signaling transmitted to the second device.

Aspect 27: The method of aspect 23, further comprising: receiving, from the second device, a second message indi-cating feedback associated with a performance of a first machine learning model used at the second device for classifying traffic, wherein transmitting the first message requesting the information associated with the machine learning model is based at least in part on the feedback.

Aspect 28: The method of any of aspects 23 through 27, further comprising: training the machine learning model using a plurality of information sets, wherein each informa-tion set of the plurality of information sets is associated with a respective traffic class of a set of known traffic classes, and wherein the machine learning model is to be used for identifying, at the second device, whether the traffic class associated with the signaling transmitted from the first device is included in the set of known traffic classes.

Aspect 29: The method of any of aspects 23 through 28, further comprising: training the machine learning model using a plurality of information sets, wherein each information set of the plurality of information sets is associated with a respective application of a plurality of applications, and wherein the machine learning model is to be used for identifying, at the second device, an application associated with the signaling transmitted from the first device.

Aspect 30: The method of any of aspects 23 through 29, further comprising: training the machine learning model using a plurality of information sets, wherein each information set of the plurality of information sets is associated with a respective internet protocol flow of a plurality of internet protocol flows, and wherein the machine learning model is to be used for identifying, at the second device, an internet protocol flow associated with the signaling transmitted from the first device.

Aspect 31: The method of any of aspects 23 through 29, further comprising: training the machine learning model using a plurality of information sets, wherein each information set of the plurality of information sets is associated with a respective access category of a plurality of access categories, and wherein the machine learning model is to be used for identifying, at the second device, an access category associated with the signaling transmitted from the first device.

Aspect 32: The method of any of aspects 23 through 29, further comprising: training the machine learning model using a plurality of information sets, wherein each information set of the plurality of information sets is associated with a respective traffic identifier of a plurality of traffic identifiers, and wherein the machine learning model is to be used, at the second device, for identifying a traffic identifier associated with the signaling transmitted from the first device.

Aspect 33: The method of any of aspects 23 through 29, further comprising: training the machine learning model using a plurality of information sets, wherein each information set of the plurality of information sets is associated with a respective user priority of a plurality of user priorities, and wherein the machine learning model is to be used for identifying, at the second device, a user priority associated with the signaling transmitted from the first device.

Aspect 34: The method of any of aspects 23 through 29, further comprising: training the machine learning model using a plurality of information sets, wherein each information set of the plurality of information sets is associated with a respective periodicity, and wherein the machine learning model is to be used for identifying, at the second device, whether the signaling transmitted from the first device is periodic or aperiodic.

Aspect 35: The method of aspect 34, wherein the information comprises a first parameter corresponding to a frequency component and a second parameter corresponding to an energy threshold.

Aspect 36: The method of any of aspects 23 through 35, wherein the machine learning model comprises a random forests model or a deep neural network-based model.

Aspect 37: The method of any of aspects 23 through 36, wherein the information comprises a quantity of layers included in the machine learning model, a respective quantity of neurons associated with each layer included in the machine learning model, and a plurality of weights to be used for connecting each neuron included in the machine learning model.

Aspect 38: The method of any of aspects 23 through 37, wherein the traffic class corresponds to a type of application, and the type of application comprises an XR application, a gaming application, or a video conferencing application.

Aspect 39: The method of any of aspects 23 through 38, wherein the first device and the second device comprise STAs.

Aspect 40: An apparatus for wireless communication at a first device, comprising a processor; memory coupled with the processor; and instructions stored in the memory and executable by the processor to cause the apparatus to perform a method of any of aspects 1 through 22.

Aspect 41: An apparatus for wireless communication at a first device, comprising at least one means for performing a method of any of aspects 1 through 22.

Aspect 42: A non-transitory computer-readable medium storing code for wireless communication at a first device, the code comprising instructions executable by a processor to perform a method of any of aspects 1 through 22.

Aspect 43: An apparatus for wireless communication at a first device, comprising a processor; memory coupled with the processor; and instructions stored in the memory and executable by the processor to cause the apparatus to perform a method of any of aspects 23 through 39.

Aspect 44: An apparatus for wireless communication at a first device, comprising at least one means for performing a method of any of aspects 23 through 39.

Aspect 45: A non-transitory computer-readable medium storing code for wireless communication at a first device, the code comprising instructions executable by a processor to perform a method of any of aspects 23 through 39.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:

transmitting signaling to a second device, wherein the signaling is associated with a traffic class;

receiving a second message requesting information associated with a machine learning model; and transmitting, based at least in part on the second message, a first message indicating the information associated with the machine learning model, the information comprising one or more parameters usable to obtain the machine learning model, wherein the machine learning model is to be used at the second device for identifying the traffic class.

2. The method of claim 1, further comprising:
transmitting, to the second device, a third message indicating feedback associated with a performance of a first machine learning model used at the second device for classifying traffic, wherein transmitting the first message is based at least in part on the feedback.

3. The method of claim 2, wherein transmitting the third message is based at least in part on determining that a first traffic class identified at the second device is different from a second traffic class associated with the signaling transmitted to the second device.

4. The method of claim 1, further comprising:
receiving, from the second device, a third message indicating feedback associated with a performance of a first machine learning model used at the second device for classifying traffic, wherein transmitting the first message indicating the information associated with the machine learning model is based at least in part on the feedback.

5. The method of claim 1, further comprising:
training the machine learning model using a plurality of information sets, wherein each information set of the plurality of information sets is associated with a respective traffic class of a set of known traffic classes, and wherein the machine learning model is to be used for identifying, at the second device, whether the traffic class associated with the signaling transmitted from the first device is included in the set of known traffic classes.

6. The method of claim 1, further comprising:
training the machine learning model using a plurality of information sets, wherein each information set of the plurality of information sets is associated with a respective application of a plurality of applications, and wherein the machine learning model is to be used for identifying, at the second device, an application associated with the signaling transmitted from the first device.

7. The method of claim 1, further comprising:
training the machine learning model using a plurality of information sets, wherein each information set of the plurality of information sets is associated with a respective internet protocol flow of a plurality of internet protocol flows, and wherein the machine learning model is to be used for identifying, at the second device, an internet protocol flow associated with the signaling transmitted from the first device.

8. The method of claim 1, further comprising:
training the machine learning model using a plurality of information sets, wherein each information set of the plurality of information sets is associated with a respective access category of a plurality of access categories, and wherein the machine learning model is to be used for identifying, at the second device, an access category associated with the signaling transmitted from the first device.

9. The method of claim 1, further comprising:
training the machine learning model using a plurality of information sets, wherein each information set of the plurality of information sets is associated with a respective traffic identifier of a plurality of traffic identifiers, and wherein the machine learning model is to be used, at the second device, for identifying a traffic identifier associated with the signaling transmitted from the first device.

10. The method of claim 1, further comprising:
training the machine learning model using a plurality of information sets, wherein each information set of the plurality of information sets is associated with a respective user priority of a plurality of user priorities, and wherein the machine learning model is to be used for identifying, at the second device, a user priority associated with the signaling transmitted from the first device.

11. The method of claim 1, further comprising:
training the machine learning model using a plurality of information sets, wherein each information set of the plurality of information sets is associated with a respective periodicity, and wherein the machine learning model is to be used for identifying, at the second device, whether the signaling transmitted from the first device is periodic or aperiodic.

12. The method of claim 11, wherein the information comprises a first parameter corresponding to a frequency component and a second parameter corresponding to an energy threshold.

13. The method of claim 1, wherein the machine learning model comprises a random forests model or a deep neural network-based model.

14. The method of claim 1, wherein the information comprises a quantity of layers included in the machine learning model, a respective quantity of neurons associated with each layer included in the machine learning model, and a plurality of weights to be used for connecting each neuron included in the machine learning model.

15. The method of claim 1, wherein the traffic class corresponds to a type of application, and the type of application comprises an extended reality application, a gaming application, or a video conferencing application.

16. The method of claim 1, wherein the first device and the second device comprise stations.

17. An apparatus for wireless communication at a first device, comprising:
a processor;
memory coupled with the processor; and
instructions stored in the memory and executable by the processor to cause the apparatus to:
transmit signaling to a second device, wherein the signaling is associated with a traffic class;
receive a second message requesting information associated with a machine learning model; and
transmit, based at least in part on the second message, a first message indicating the information associated with the machine learning model, the information comprising one or more parameters usable to obtain the machine learning model, wherein the machine learning model is to be used at the second device for identifying the traffic class.

18. The apparatus of claim 17, wherein the instructions are further executable by the processor to cause the apparatus to:
transmit, to the second device, a third message indicating feedback associated with a performance of a first machine learning model used at the second device for classifying traffic, wherein transmitting the first message is based at least in part on the feedback.

19. The apparatus of claim 18, wherein transmitting the third message is based at least in part on determining that a first traffic class identified at the second device is different from a second traffic class associated with the signaling transmitted to the second device.

20. The apparatus of claim 17, wherein the instructions are further executable by the processor to cause the apparatus to:

receive, from the second device, a third message indicating feedback associated with a performance of a first machine learning model used at the second device for classifying traffic, wherein transmitting the first message indicating the information associated with the machine learning model is based at least in part on the feedback.

21. The apparatus of claim 17, wherein the instructions are further executable by the processor to cause the apparatus to:

train the machine learning model using a plurality of information sets, wherein each information set of the plurality of information sets is associated with a respective traffic class of a set of known traffic classes, and wherein the machine learning model is to be used for identifying, at the second device, whether the traffic class associated with the signaling transmitted from the first device is included in the set of known traffic classes.

22. The apparatus of claim 17, wherein the instructions are further executable by the processor to cause the apparatus to:

train the machine learning model using a plurality of information sets, wherein each information set of the plurality of information sets is associated with a respective application of a plurality of applications, and wherein the machine learning model is to be used for identifying, at the second device, an application associated with the signaling transmitted from the first device.

23. The apparatus of claim 17, wherein the instructions are further executable by the processor to cause the apparatus to:

train the machine learning model using a plurality of information sets, wherein each information set of the plurality of information sets is associated with a respective internet protocol flow of a plurality of internet protocol flows, and wherein the machine learning model is to be used for identifying, at the second device, an internet protocol flow associated with the signaling transmitted from the first device.

24. The apparatus of claim 17, wherein the instructions are further executable by the processor to cause the apparatus to:

train the machine learning model using a plurality of information sets, wherein each information set of the plurality of information sets is associated with a respective access category of a plurality of access categories, and wherein the machine learning model is to be used for identifying, at the second device, an access category associated with the signaling transmitted from the first device.

25. The apparatus of claim 17, wherein the instructions are further executable by the processor to cause the apparatus to:

train the machine learning model using a plurality of information sets, wherein each information set of the plurality of information sets is associated with a respective traffic identifier of a plurality of traffic identifiers, and wherein the machine learning model is to be used, at the second device, for identifying a traffic identifier associated with the signaling transmitted from the first device.

26. The apparatus of claim 17, wherein the instructions are further executable by the processor to cause the apparatus to:

train the machine learning model using a plurality of information sets, wherein each information set of the plurality of information sets is associated with a respective user priority of a plurality of user priorities, and wherein the machine learning model is to be used for identifying, at the second device, a user priority associated with the signaling transmitted from the first device.

27. The apparatus of claim 17, wherein the instructions are further executable by the processor to cause the apparatus to:

train the machine learning model using a plurality of information sets, wherein each information set of the plurality of information sets is associated with a respective periodicity, and wherein the machine learning model is to be used for identifying, at the second device, whether the signaling transmitted from the first device is periodic or aperiodic.

28. The apparatus of claim 27, wherein the information comprises a first parameter corresponding to a frequency component and a second parameter corresponding to an energy threshold.

29. The apparatus of claim 17, wherein the machine learning model comprises a random forests model or a deep neural network-based model.

30. The apparatus of claim 17, wherein the information comprises a quantity of layers included in the machine learning model, a respective quantity of neurons associated with each layer included in the machine learning model, and a plurality of weights to be used for connecting each neuron included in the machine learning model.

31. The apparatus of claim 17, wherein the traffic class corresponds to a type of application, and the type of application comprises a gaming application or a video conferencing application.

32. The apparatus of claim 17, wherein the first device and the second device comprise stations.

33. An apparatus for wireless communication at a first device, comprising:

means for transmitting signaling to a second device, wherein the signaling is associated with a traffic class;

means for receiving a second message requesting information associated with a machine learning model; and means for transmitting, based at least in part on the second message, a first message indicating the information associated with the machine learning model, the information comprising one or more parameters usable to obtain the machine learning model, wherein the machine learning model is to be used at the second device for identifying the traffic class.

34. A non-transitory computer-readable medium storing code for wireless communication at a first device, the code comprising instructions executable by a processor to:

transmit signaling to a second device, wherein the signaling is associated with a traffic class;

receive a second message requesting information associated with a machine learning model; and transmit, based at least in part on the second message, a first message indicating the information associated with the machine learning model, the information comprising one or more parameters usable to obtain the machine learning model, wherein the machine learning model is to be used at the second device for identifying the traffic class.

\* \* \* \* \*